United States Patent
Zhu et al.

(10) Patent No.: US 9,306,700 B2
(45) Date of Patent: Apr. 5, 2016

(54) METHOD AND DEVICE FOR TRANSMITTING OPTICAL SIGNALS

(75) Inventors: Songlin Zhu, Shenzhen (CN); Dan Geng, Shenzhen (CN); Zian He, Shenzhen (CN); Weiliang Zhang, Shenzhen (CN); Yongjia Yin, Shenzhen (CN); Yong Guo, Shenzhen (CN); Xingang Huang, Shenzhen (CN); Dezhi Zhang, Shenzhen (CN)

(73) Assignee: ZTE CORPORATION (CN)

(*) Notice: Subject to any disclaimer, the term of this patent is extended or adjusted under 35 U.S.C. 154(b) by 103 days.

(21) Appl. No.: 14/351,660

(22) PCT Filed: Jun. 29, 2012

(86) PCT No.: PCT/CN2012/077976
§ 371 (c)(1),
(2), (4) Date: Jul. 18, 2014

(87) PCT Pub. No.: WO2013/053249
PCT Pub. Date: Apr. 18, 2013

(65) Prior Publication Data
US 2014/0355987 A1 Dec. 4, 2014

(30) Foreign Application Priority Data
Oct. 14, 2011 (CN) .......................... 2011 1 0312984

(51) Int. Cl.
*H04B 10/00* (2013.01)
*H04J 14/02* (2006.01)
*H04B 10/2537* (2013.01)
*H04B 10/572* (2013.01)

(52) U.S. Cl.
CPC ........ *H04J 14/0224* (2013.01); *H04B 10/2537* (2013.01); *H04B 10/572* (2013.01)

(58) Field of Classification Search
None
See application file for complete search history.

(56) References Cited

U.S. PATENT DOCUMENTS

| 2006/0140639 | A1* | 6/2006 | Effenberger | ....... | H04B 10/2916 398/159 |
| 2006/0257148 | A1* | 11/2006 | Hirth | .................. | H04B 10/2537 398/71 |
| 2008/0292316 | A1* | 11/2008 | Litvin | ................. | H04J 14/0224 398/79 |
| 2010/0316382 | A1* | 12/2010 | Litvin | ................ | H04B 10/2916 398/79 |

(Continued)

FOREIGN PATENT DOCUMENTS

| CN | 101197622 | 6/2008 |
| CN | 101466052 | 6/2009 |

OTHER PUBLICATIONS

International Search Report PCT/CN2012/077976 filed Jun. 29, 2012; Mail date Oct. 18, 2012.

Primary Examiner — Danny Leung
(74) Attorney, Agent, or Firm — Cantor Colburn LLP

(57) ABSTRACT

Disclosed are a method and device for transmitting optical signals. The method comprises: if there is Raman crosstalk between a first optical network system and a coexistence system, an upstream wavelength band of the first optical network system is set outside a range with an upstream wavelength band of the coexistence system being a center and with an impact intensity of the Raman crosstalk being a radius, and a downstream wavelength band of the first optical network system is set outside a range with the downstream wavelength band of the coexistence system being a center and with the impact intensity of the Raman crosstalk being a radius; and optical signals are transmitted by using the upstream wavelength band of the first optical network system and the downstream wavelength band of the first optical network system. The disclosure can avoid interference and improve signal quality.

14 Claims, 19 Drawing Sheets

(56) References Cited

U.S. PATENT DOCUMENTS

2011/0019823 A1* 1/2011 Townsend ............. H04L 9/0852 380/256

2014/0079395 A1* 3/2014 Effenberger ....... H04B 10/2537 398/66

2014/0355987 A1* 12/2014 Zhu ................... H04B 10/2537 398/58

* cited by examiner

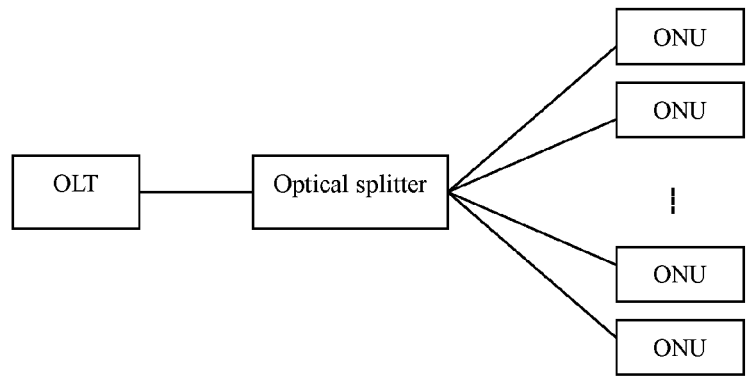

FIG. 1 if there is Raman crosstalk between a first optical network system and a coexistence system, an upstream wavelength band of the first optical network system is set outside a range with an upstream wavelength band of the coexistence system being a center and with an impact intensity of the Raman crosstalk being a radius, and a downstream wavelength band of the first optical network system is set outside a range with a downstream wavelength band of the coexistence system being a center and with the impact intensity of the Raman crosstalk being a radius — S202 the optical signals are transmitted by using the upstream wavelength band of the first optical network system and the downstream wavelength band of the first optical network system — S204

FIG. 2

METHOD AND DEVICE FOR TRANSMITTING OPTICAL SIGNALS

TECHNICAL FIELD

The disclosure relates to the field of communications, and in particular to a method and device for transmitting optical signals.

BACKGROUND

Gigabit-Capable Passive Optical Network (GPON) technology is an important technical branch in the Passive Optical Network (PON) family. Similar to other PON technologies, GPON is a passive optical access technology adopting point-to-multipoint topology.

FIG. 1 is a schematic diagram of a topology of a GPON system according to the relevant art. As shown in FIG. 1, the GPON consists of an Optical Line Terminal (OLT) on the office center side, an Optical Network Units (ONU) on the user side, and an Optical Distribution Network (ODN), and usually adopts a point-to-multipoint network structure. The ODN consists of passive optical devices such as single mode fibers, an optical splitter and an optical connector, and provides optical transmission medium for a physical connection between the OLT and the ONU. The range of the downstream wavelength band of GPON is 1480 nm to 1500 nm, and the range of the upstream wavelength band is 1290 nm to 1330 nm; and the downstream rate of GPON is 2.5 Gbit/S, and the upstream rate is 1.25 Gbit/S.

With the development of Internet technology and the increasing requirements of large bandwidth, the GPON-based next generation PON technology is developed rapidly, and it is commonly believed that the XG-PON1 technology is a next generation PON technology that may be adopted in the future. The downstream rate of XG-PON1 technology is 10 G, and the upstream rate is 2.5 G, which may satisfy the bandwidth needs of resident users. The range of the downstream wavelength band of XG-PON1 system is 1575 nm to 1580 nm, and the range of the upstream wavelength band is 1260 nm to 1280 nm. The XG-PON1 system reuses the ODN of GPON system, and the downstream signals of XG-PON1 (a Gigabit-Capable passive optical network with a rate of 10 Gbit/S) system and GPON system are combined by a WDM device and transmitted to an ONU of XG-PON1 and an ONU of GPON via the same ODN. Each of the ONU of XG-PON1 and the ONU of GPON is provided with a filter, the filter of the ONU of XG-PON1 filtering out the downstream signals of GPON, the filter of the ONU of GPON filtering out the downstream signals of XG-PON1.

At present, operators make a request for transmission of wireless signals, high definition television signals, etc. in a PON system, which requires to further increase the transmission bandwidth of PON system. In order to meet the above requirements, the next generation PON technology, i.e., NGPON2 technology, with a downstream transmission rate being at least 40 Gbit/s and with an upstream transmission rate being at least 20 Gbit/s, is proposed. In order to ensure that the service of current users in a network is unaffected and to protect the ODN that is invested and established by an operator, it is needed to coexist the NGPON2 technology with the GPON and XG-PON1 systems on the existing ODN, or only coexist the NGPON2 technology with the GPON or XGPON1 system on the existing ODN. In order to solve the above problem, it is in urgent need of determining the downstream wavelength band value of downstream signals and the upstream wavelength band value of upstream signals transmitted by the NGPON2 system. The improper setting of the wavelength values of NGPON2 will cause the Raman effect in the optical fibers, thus the degradation of signal-to-noise ratio, carrier-to-noise ratio and optical power budget of the PON system or analog television signals transmitted in the ODN is caused.

SUMMARY

The disclosure provides a method and device for transmitting optical signals to solve the problem of the degradation of signal-to-noise ratio, carrier-to-noise ratio and optical power budget of system due to the reason that there is Raman crosstalk between a first optical network system and a coexistence system have in relevant art.

In order to achieve the above object, according to one aspect of the disclosure, a method for transmitting optical signals is provided.

The method for transmitting optical signals according to the disclosure comprises: If there is Raman crosstalk between a first optical network system and a coexistence system, the upstream wavelength band of the first optical network system is set outside a range with the upstream wavelength band of the coexistence system being the center and with the impact intensity of the Raman crosstalk being the radius, and the downstream wavelength band of the first optical network system is set outside a range with the downstream wavelength band of the coexistence system being the center and with the impact intensity of the Raman crosstalk being the radius; and optical signals are transmitted by using the upstream wavelength band of the first optical network system and the downstream wavelength band of the first optical network system.

Preferably, if there is Raman crosstalk between the first optical network system and a first coexistence system in the coexistence system and between the first optical network system and a second coexistence system in the coexistence system, setting the upstream wavelength band of the first optical network system outside the range with the upstream wavelength band of the coexistence system being the center and with the impact intensity of the Raman crosstalk being the radius comprises: calculating a first range with the upstream wavelength band of the first coexistence system being the center and with the impact intensity of the Raman crosstalk being the radius, calculating a second range with the upstream wavelength band of the second coexistence system being the center and with the impact intensity of the Raman crosstalk being the radius, and setting the upstream wavelength band of the first optical network system outside of a range of an intersection of the first range and the second range; and setting the downstream wavelength band of the first optical network system outside the range with the downstream wavelength band of the coexistence system being the center and with the impact intensity of the Raman crosstalk being the radius comprises calculating a third range with the downstream wavelength band of the first coexistence system being the center and with the impact intensity of the Raman crosstalk being the radius, calculating a fourth range with the downstream wavelength band of the second coexistence system being the center and with the impact intensity of the Raman crosstalk being the radius, and setting the downstream wavelength band of the first optical network system outside of a range of an intersection of the third range and the fourth range.

Preferably, the first optical network system is an NGPON2 system, and the above coexistence system comprises at least one of a GPON system, an XGPON1 system and a Video system.

Preferably, if the NGPON2 system coexists with the GPON system and the Video system, the upstream wavelength band of the NGPON2 system is set in the range of 1575 to 1580 nm, and the downstream wavelength band of the NGPON2 system is set in the range of 1260 nm to 1280 nm.

Preferably, if the NGPON2 system coexists with the XGPON1 system and the Video system, the upstream wavelength band of the NGPON2 system is set in the range of 1480 nm to 1500 nm, and the downstream wavelength band of the NGPON2 system is set in the range of 1290 nm to 1330 nm.

Preferably, if the NGPON2 system coexists with the GPON system and the XGPON1 system, an upstream wavelength band of the NGPON2 system is set in the range of 1550 nm to 1560 nm, or in the range of 1500 nm to 1550 nm, or in the range of 1580 nm to 1625 nm, or in the range of 1560 nm to 1575 nm, and the downstream wavelength band of the NGPON2 system is set in the range of 1310 nm to 1480 nm.

Preferably, a four-port wavelength division multiplexer is configured to implement the coexistence of the NGPON2 system, the GPON system and the XGPON1 system, wherein the four-port wavelength division multiplexer is respectively connected to a common port, a port of the NGPON2 system, a port of the GPON system, and a port of the XGPON1 system; the downstream signals sent from an OLT in the NGPON2 system, an OLT in the GPON system and an OLT in the XGPON1 system are input respectively via ports of the four-port wavelength division multiplexer which are corresponding to the NGPON2 system, the GPON system and the XGPON1 system, combined and output to an ODN, and then forwarded to ONUs; and the upstream signals sent from an ONU in the NGPON2 system, an ONU in the GPON system and an ONU in the XGPON1 system are transmitted via the ODN, and then input to the corresponding OLTs via the ports of the four-port wavelength division multiplexer which are corresponding to the NGPON2 system, the GPON system and the XGPON1 system.

Preferably, if the NGPON2 system coexists with the GPON system, the XGPON1 system and the Video system, the upstream wavelength band of the NGPON2 system is set in the range of 1500 nm to 1550 nm, or in the range of 1580 nm to 1625 nm, or in the range of 1560 nm to 1575 nm, and the downstream wavelength band of the NGPON2 system is set in the range of 1310 nm to 1480 nm.

Preferably, a five-port wavelength division multiplexer is configured to implement the coexistence of the NGPON2 system, the GPON system, the XGPON1 system and the Video system, wherein the five-port wavelength division multiplexer is respectively connected to a common port, a port of the NGPON2 system, a port of the GPON system, and a port of the XGPON1 system; the downstream signals sent from an OLT in the NGPON2 system, an OLT in the GPON system, an OLT in the XGPON1 system and an OLT in the Video system are input via the ports of the five-port wavelength division multiplexer which are corresponding to the NGPON2 system, the GPON system, the XGPON1 system and the Video system, combined and output to an ODN, and then forwarded to ONUs; and the upstream signals sent from an ONU in the NGPON2 system, an ONU in the GPON system and an ONU in the XGPON1 system are transmitted via the ODN, and then input to the corresponding OLTs via the ports of the five-port wavelength division multiplexer which are corresponding to the NGPON2 system, the GPON system and the XGPON1 system.

In order to achieve the above object, according to another aspect of the disclosure, a device for transmitting optical signals is provided.

The device for transmitting optical signals according to the disclosure comprises: a setting module configured to, if there is Raman crosstalk between a first optical network system and a coexistence system, set the upstream wavelength band of the first optical network system outside a range with the upstream wavelength band of the coexistence system being the center and with the impact intensity of the Raman crosstalk being the radius, and to set the downstream wavelength band of the first optical network system outside a range with the downstream wavelength band of the coexistence system being the center and with the impact intensity of the Raman crosstalk being the radius; and a transmission module configured to transmit optical signals by using the upstream wavelength band of the first optical network system and the downstream wavelength band of the first optical network system.

Preferably, the setting module comprises: a first calculation sub-module configured to calculate a first range with the upstream wavelength band of a first coexistence system in the coexistence system being the center and with the impact intensity of the Raman crosstalk being the radius; a second calculation sub-module configured to calculate a second range with the upstream wavelength band of a second coexistence system in the coexistence system being the center and with the impact intensity of the Raman crosstalk being the radius; a first setting sub-module configured to set the upstream wavelength band of the first optical network system outside a range of the intersection of the first range and the second range; a third calculation sub-module configured to calculate a third range with the downstream wavelength band of the first coexistence system being the center and with the impact intensity of the Raman crosstalk being the radius; a fourth calculation sub-module configured to calculate a fourth range with the downstream wavelength band of the second coexistence system being the center and with the impact intensity of the Raman crosstalk being the radius; and a second setting sub-module configured to set the downstream wavelength band of the first optical network system outside a range of the intersection of the third range and the fourth range.

Preferably, the first optical network system is a NGPON2 system, and the coexistence system comprises at least one of a GPON system, a XGPON1 system and a Video system.

In accordance with the disclosure, the wavelength of the first optical network system is set outside the range with the impact intensity of the Raman crosstalk being the radius, so as to avoid interference and improve signal quality.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein FIG. 1 shows a schematic diagram illustrating a topology of a GPON system according to the relevant art;

FIG. 2 shows a flowchart of a method for transmitting optical signals according to an embodiment of the disclosure;

DETAILED DESCRIPTION OF THE EMBODIMENTS

Figure 3:
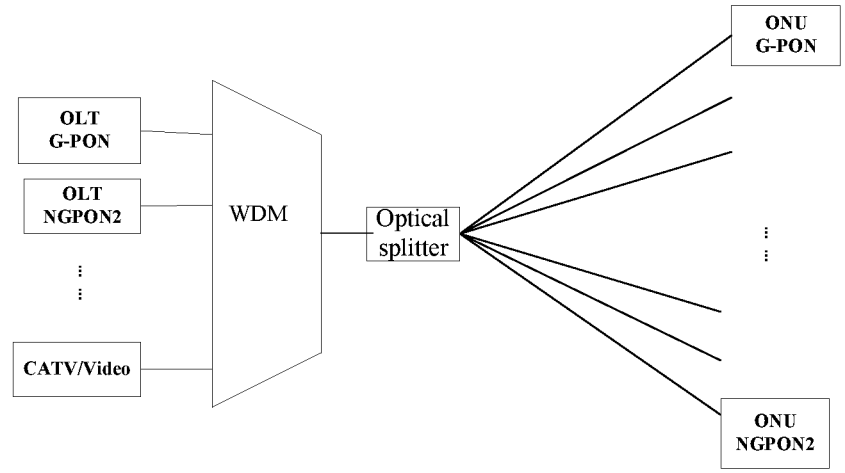
FIG. 3 shows a schematic diagram illustrating system architecture of coexistence of NGPON2 and GPON and Video according to an embodiment of the disclosure.

Note that, the embodiments of the disclosure and the features of the embodiments can be combined with each other if there is no conflict. The embodiments of the disclosure are described in conjunction with the drawings as follows.

FIG. 2 shows a flowchart of a method for transmitting optical signals according to an embodiment of the disclosure. As shown in FIG. 2, the method comprises step S202 to step S204 as follows.

Step S202, if there is Raman crosstalk between a first optical network system and a coexistence system, an upstream wavelength band of the first optical network system is set outside a range with an upstream wavelength band of the coexistence system being a center and with an impact intensity of the Raman crosstalk being a radius, and a downstream wavelength band of the first optical network system is set outside a range with a downstream wavelength band of the coexistence system being a center and with the impact intensity of the Raman crosstalk being a radius.

Step S204, the optical signals are transmitted by using the upstream wavelength band of the first optical network system and the downstream wavelength band of the first optical network system.

In the related art, there is Raman crosstalk between the first optical network system and the coexistence system, so as to cause the degradation of signal-to-noise ratio, carrier-to-noise ratio and optical power budget of system. In an embodiment of the disclosure, since the range of the influence of the above Raman crosstalk is limited, the wavelength band of the first optical network system is set outside the range with the impact intensity of the Raman crosstalk being the radius, to thereby avoid interference and improve signal quality.

In addition, an embodiment of the disclosure also provides a preferred technical solution if there is Raman crosstalk between the first optical network system and the first coexistence system in the coexistence system and between the first optical network system and the second coexistence system in the coexistence system. An upstream wavelength band of the first optical network system is set by firstly calculating a first range with the upstream wavelength band of the first coexistence system being a center and with the impact intensity of the Raman crosstalk being a radius, calculating a second range with the upstream wavelength band of the second coexistence system being a center and with the impact intensity of the Raman crosstalk being a radius, and then setting the upstream wavelength band of the first optical network system outside a range of the intersection between the first range and the second range. A downstream wavelength band of the first optical network system is set by firstly calculating a third range with the downstream wavelength band of the first coexistence system being a center and with the impact intensity of the Raman crosstalk being a radius, calculating a fourth range with the downstream wavelength band of the second coexistence system being a center and with the impact intensity of the Raman crosstalk being a radius, and then setting a downstream wavelength band of the first optical network system outside a range of the intersection between the third range and the fourth range. Thus, the wavelength of the first optical network system may be set outside a range of the intersection of the ranges of each coexistence system, to thereby avoid interference and improve signal quality.

Preferably, the first optical network system is an NGPON2 system, and the coexistence system comprises at least one of the following: a GPON system, an XGPON1 system and a Video system.

In order to illustrate the above method for setting the wavelength of NGPON2 system more clearly, the embodiment of the disclosure provides four specific examples according to the different combinations of the coexistence systems, which are described below in detail.

Example 1

If the NGPON2 system coexists with the GPON system and the Video system, then an upstream wavelength band of the NGPON2 system is 1575 to 1580 nm, and a downstream wavelength band of the NGPON2 system is 1260 nm to 1280 nm.

Example 2

If the NGPON2 system coexists with the XGPON1 system and the Video system, an upstream wavelength band of the NGPON2 system is 1480 nm to 1500 nm, and a downstream wavelength band of the NGPON2 system is 1290 nm to 1330 nm.

Example 3

If the NGPON2 system coexists with the GPON system and the XGPON1 system, an upstream wavelength band of the NGPON2 system is set in the range of 1550 nm to 1560 nm, or 1500 nm to 1550 nm, or 1580 nm to 1625 nm, or 1560 nm to 1575 nm, and a downstream wavelength band of the NGPON2 system is set in the range of 1310 nm to 1480 nm.

The example 3 also provides a four-port wavelength division multiplexer which could implement the coexistence of the NGPON2 system, the GPON system and the XGPON1 system. The four-port wavelength division multiplexer is respectively connected to a common port, a port of the NGPON2 system, a port of the GPON system, and a port of the XGPON1 system. The downstream signals sent from an OLT in the NGPON2 system, an OLT in the GPON system and an OLT in the XGPON1 system are input respectively via ports of the four-port wavelength division multiplexer, wherein the ports are corresponding to the NGPON2 system, the GPON system and the XGPON1 system respectively. The downstream signals input are combined and output to an ODN, and then forwarded to ONUs. The upstream signals sent from an ONU in the NGPON2 system, an ONU in the GPON system and an ONU in the XGPON1 system are transmitted via the ODN, and then input to the corresponding OLTs respectively via the ports of the four-port wavelength division multiplexer, wherein the ports are corresponding to the NGPON2 system, the GPON system and the XGPON1 system.

Example 4

If the NGPON2 system coexists with the GPON system, the XGPON1 system and the Video system, an upstream wavelength band of the NGPON2 system is set in the range of 1500 nm to 1550 nm, or 1580 nm to 1625 nm, or 1560 nm to 1575 nm, and a downstream wavelength band of the NGPON2 system is set in the range of 1310 nm to 1480 nm.

The example 4 also provides a five-port wavelength division multiplexer which could implement the coexistence of the NGPON2 system, the GPON system, the XGPON1 system and the Video system. The five-port wavelength division multiplexer is respectively connected to a common port, a port of the NGPON2 system, a port of the GPON system, a port of the XGPON1 system. The downstream signals sent from an OLT in the NGPON2 system, an OLT in the GPON system, an OLT in the XGPON1 system and an OLT in the Video system are input respectively via the ports of the five-port wavelength division multiplexer, wherein the ports are corresponding to the NGPON2 system, the GPON system, XGPON1 system and the Video system respectively. The downstream signals input are combined and output to an ODN, and then forwarded to ONUs. The upstream signals sent from an ONU in the NGPON2 system, an ONU in the GPON system and an ONU in the XGPON1 system are transmitted via the ODN, and then input to the corresponding OLTs respectively via the ports of the five-port wavelength division multiplexer, wherein the ports are corresponding to the NGPON2 system, the GPON system and the XGPON1 system.

The implementation process of the disclosure will be described hereinafter in detail in conjunction the preferred embodiments.

Preferred Embodiment 1

This preferred embodiment 1 describes the case of the coexistence of GPON, NGPON2 and Video.

FIG. 3 shows a schematic diagram illustrating system architecture of coexistence of NGPON2 and GPON and Video according to an embodiment of the disclosure, wherein an upstream wavelength band of the NGPON2 is in the range of 1575 to 1580 nm, and a downstream wavelength band of the NGPON2 is in the range of 1260 nm to 1280 nm.

As shown in FIG. 3, the downstream signals of GPON and NGPON2 and the downstream signals of Video are combined respectively via three ports of WDM and transmitted in an optical fiber to an optical splitter, and reach the ONUS via the optical splitter. A filter plate is provided at each of GPON and NGPON2, the downstream signals of NGPON2 and the signals of Video are filtered out by the filter plate at the ONU in the GPON system, and only the downstream signals of GPON are received. If the ONU is only required to receive the signals of Video, the downstream signals of NGPON2 and the downstream signals of GPON are filtered out by the filter plate at the ONU in the GPON system, and only the downstream signals of Video are received. If the ONU is required to receive the signals of Video and the downstream signals of GPON, two receivers are provided at the ONU. The downstream signals of NGPON2 and the downstream signals of GPON are filtered out by the filter plate of one receiver, and only the downstream signals of Video are received; and the downstream signals of NGPON2 and the signals of Video are filtered out by the filter plate of the other receiver, and only the downstream signals of GPON are received. The downstream signals of GPON and the signals of Video are filtered by the filter plate at the ONU in the NGPON2 system, and only the downstream signals of NGPON2 are received. If the ONU is only required to receive the signals of Video, the downstream signals of GPON and the downstream signals of NGPON2 are filtered out by the filter plate at the ONU in the NGPON2 system, and only the downstream signals of Video are received. If the ONU is only required to receive the signals of Video and the downstream signals of NGPON2, two receivers are provided at the ONU. The downstream signals of GPON and the downstream signals of NGPON2 are filtered out by the filter plate of one receiver, and only the downstream signals of Video are received; and the downstream signals of GPON and the signals of Video are filtered out by the filter plate of the other receiver and only the downstream signals of NGPON2 are received. The upstream signals sent from the ONUs of GPON and NGPON2 are transmitted by the ODN, and input to the corresponding OLTs via the ports of the wavelength division multiplexer corresponding to GPON and NGPON2.

Preferred Embodiment 2

This preferred embodiment 2 describes the case of the coexistence of XGPON1, NGPON2 and Video.

Figure 4:
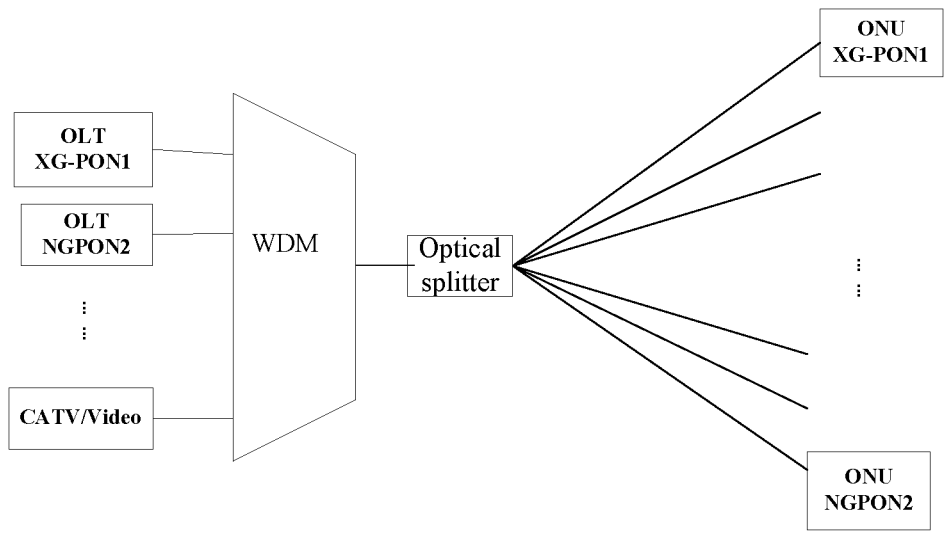
FIG. 4 shows a schematic diagram illustrating system architecture of coexistence of XGPON1, NGPON2 and Video according to an embodiment of the disclosure.

FIG. 4 shows a schematic diagram illustrating a system architecture of coexistence of XGPON1, NGPON2 and Video according to an embodiment of the disclosure, wherein an upstream wavelength band of NGPON2 is in the range of 1480 nm to 1500 nm, and a downstream wavelength band of NGPON2 is in the range of 1290 nm to 1330 nm.

As shown in FIG. 4, the downstream signals of XG-PON1 and NGPON2 and the downstream signals of Video are combined via three ports of WDM respectively and transmitted in optical fibers to an optical splitter, and reach the ONU via the optical splitter. A filter plate is provided at each of XG-PON1 and NGPON2. The downstream signals of NGPON2 and the signals of Video are filtered out by the filter plate at the ONU in the XG-PON1 system, and only the downstream signals of XG-PON1 are received. If the ONU is only required to receive the signals of Video, the downstream signals of NGPON2 and the downstream signals of XG-PON1 are filtered out by the filter plate at the ONU in the XG-PON1 system, and only the downstream signals of Video are received. If the ONU is required to receive the signals of Video and the downstream signals of XG-PON1, two receivers are provided at the ONU, the filter plate of one receiver filtering out the downstream signals of NGPON2 and the downstream signals of XG-PON1 and only receiving the downstream signals of Video, the filter plate of the other receiver filtering out the downstream signals of NGPON2 and the signals of Video and only receiving the downstream signals of XG-PON1. The filter plate at the ONU in the NGPON2 system filters out the downstream signals of XG-PON1 and the signals of Video, and only receives the downstream signals of NGPON2. If the ONU is only required to receive the signals of Video, the filter plate at the ONU in the NGPON2 system filters out the downstream signals of XG-PON1 and the downstream signals of NGPON2, and only receives the downstream signals of Video. If the ONU is only required to receive the signals of Video and the downstream signals of NGPON2, two receivers are provided at the ONU, the filter plate of one receiver filtering out the downstream signals of XG-PON1 and the downstream signals of NGPON2 and only receiving the downstream signals of Video, the filter plate of the other receiver filtering out the downstream signals of XG-PON1 and the signals of Video and only receiving the downstream signals of NGPON2. The upstream signals sent from the ONUs in XG-PON1 and NGPON2 are transmitted by the ODN, and input to the corresponding OLTs via the ports of the wavelength division multiplexer corresponding to XG-PON1 and NGPON2.

Preferred Embodiment 3

This preferred embodiment 3 describes the case of coexistence of GPON, XGPON1 and NGPON2.

Figure 5:
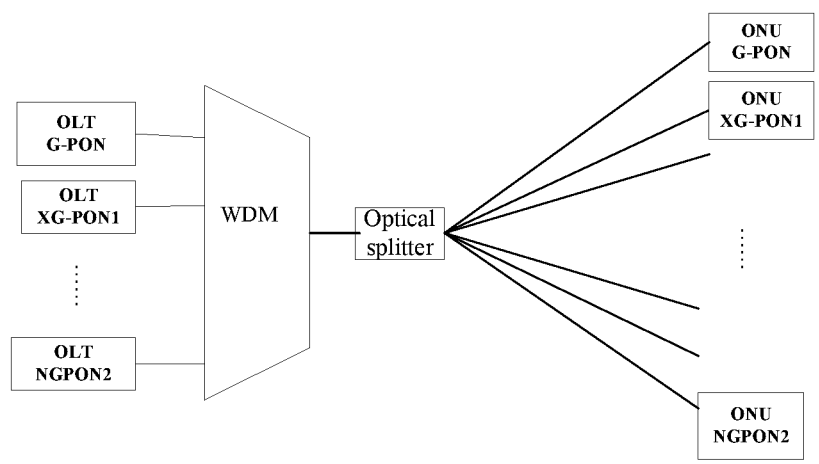
FIG. 5 shows a schematic diagram illustrating system architecture of coexistence of GPON, XGPON1 and NGPON2 according to an embodiment of the disclosure.

FIG. 5 shows a schematic diagram illustrating a system architecture of coexistence of GPON, XGPON1 and NGPON2 according to an embodiment of the disclosure, wherein the upstream wavelength band of NGPON2 is in the range of 1550 nm to 1560 nm, and the downstream wavelength band of NGPON2 is in the range of 1310 nm and 1480 nm, preferably in the range of 1340 nm to 1360 nm.

As shown in FIG. 5, the downstream signals of GPON, XG-PON1 and NGPON2 are combined via three ports of WDM respectively and transmitted in optical fibers to an optical splitter, and reach the ONUs via the optical splitter; and a filter plate is provided at the ONU in each of GPON, XG-PON1 and NGPON2, and the filter plate at the ONU in GPON system filters out the downstream signals of NGPON2 and the downstream signals of XGPON1, and only receives the downstream signals of GPON. The filter plate at the ONU in the XG-PON1 system filters out the downstream signals of NGPON2 and the downstream signals of GPON, and only receives the downstream signals of XG-PON1. The filter plate at the ONU in the NGPON2 system filters out the downstream signals of XG-PON1 and the downstream signals of GPON, and only receives the downstream signals of NGPON2. The upstream signals sent from the ONUs of GPON, XG-PON1 and NGPON2 are transmitted via the ODN, and then input to the corresponding OLTs via the ports of the wavelength division multiplexer corresponding to GPON, XG-PON1 and NGPON2.

Figure 6:
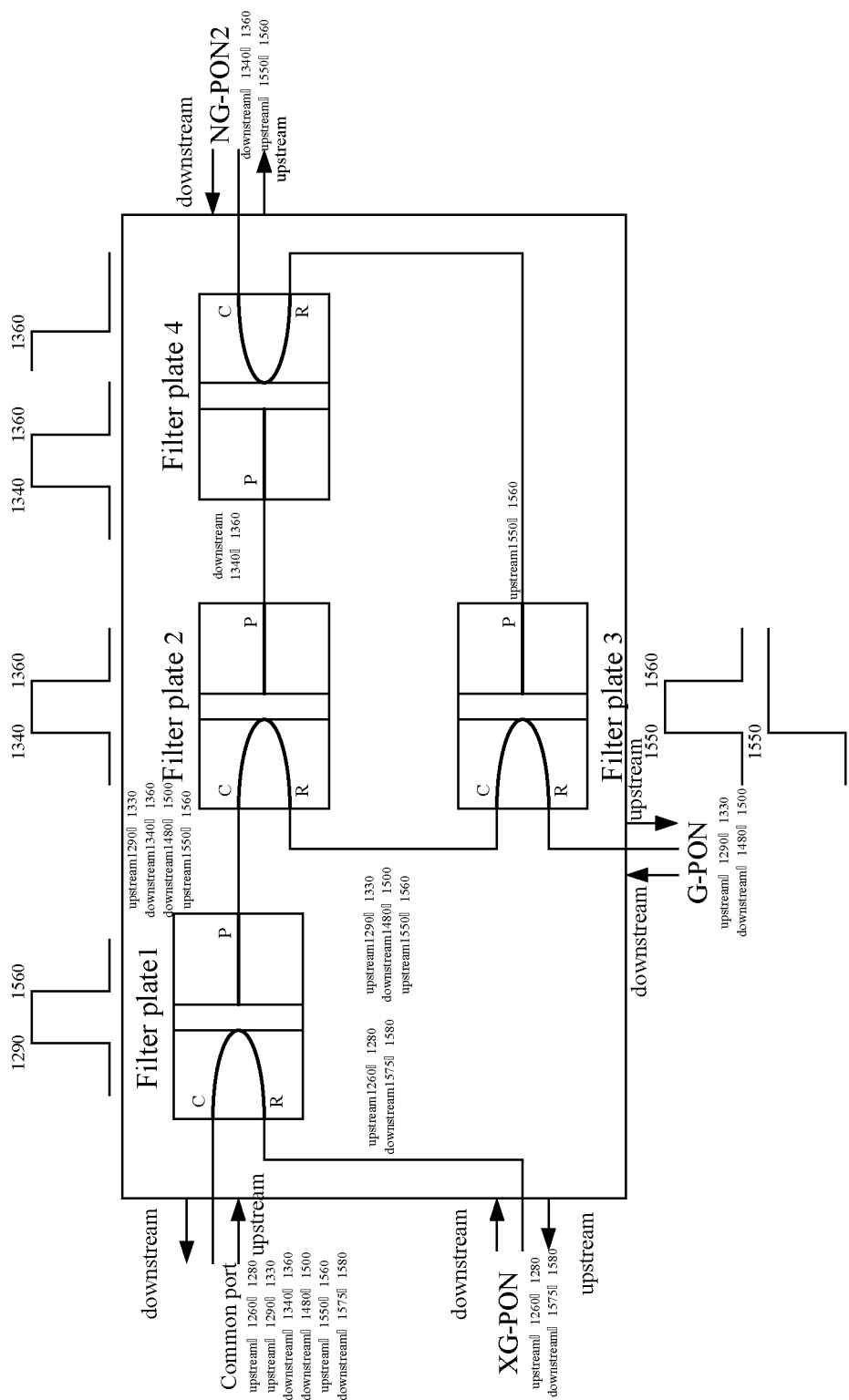
FIG. 6 shows a first schematic diagram illustrating the structure of WDM when GPON, XGPON1 and NGPON2 are in coexistence according to an embodiment of the disclosure.

FIG. 6 shows a first schematic diagram illustrating the structure of WDM when GPON, XGPON1 and NGPON2 are in coexistence according to an embodiment of the disclosure. As shown in FIG. 6, the function of WDM1r in the PON system is that: when the existing TDM-PON is evolved to NG-PON2, if all the existing PON systems need to coexist with NG-PON2, WDM1r is required to have a function to divide and combine the upstream/downstream wavelength bands of the PON systems to ensure the independent transmission therebetween.

For this purpose, the bands of wavelength division and wavelength combination required by this WDM1r include: 1260 nm-1280 nm (upstream), 1290 nm-1330 nm (upstream), 1340 nm-1360 nm (downstream), 1480 nm-1500 nm (downstream), 1550 nm-1560 nm (upstream), and 1575 nm-1580 nm (downstream).

Description of the Ports of WDM1r

WDM1r in this application is a 4-port device, comprising: a common port, a G-PON port, an XG-PON port and a NG-PON2 port.

The common port is connected to a fiber backbone, with operating wavelengths including 1260 nm-1280 nm (upstream), 1290 nm-1330 nm (upstream), 1340 nm-1360 nm (downstream), 1480 nm-1500 nm (downstream), 1550 nm-1560 nm (upstream), and 1575 nm-1580 nm (downstream).

The G-PON port is connected to an OLT optical port of a G-PON system, with operating wavelengths including 1290 nm-1330 nm (upstream) and 1480 nm-1500 nm (downstream).

The XG-PON port is connected to an OLT optical port of a XG-PON system, with operating wavelengths including 1260 nm-1280 nm (upstream) and 1575 nm-1580 nm (downstream).

The NG-PON2 port is connected to an OLT optical port of a NG-PON2 system, with operating wavelengths including 1550 nm-1560 nm (upstream) and 1340 nm-1360 nm (downstream).

The filter plates inside WDM1r will be described hereafter. A filter plate 1 is a band-pass filter plate with a pass band range of 1290 nm-1560 nm, and is used for transmission of light with wavelengths of 1290 nm-1330 nm (upstream), 1340 nm-1360 nm (downstream), 1480 nm-1500 nm (downstream), and 1550 nm-1560 nm (upstream), and for reflection of light with wavelengths of 1260 nm-1280 nm (upstream) and 1575 nm-1580 nm (downstream). A filter plate 2 is a band-pass filter plate with a pass band range of 1340 nm-1360 nm, and is used for transmission of light with wavelengths of 1340 nm-1360 nm (downstream), and for reflection of light with wavelengths of 1290 nm-1330 nm (upstream), 1480 nm-1500 nm (downstream), and 1550 nm-1560 nm (upstream). A filter plate 3 may be a band-pass filter plate with a pass band range of 1550 nm-1560 nm, or may be a sideband filter with a pass band range of more than or equal to 1550 nm. The filter plate 3 is used for transmission of light with wavelengths of 1550 nm-1560 nm (upstream), and for reflection of light with wavelengths of 1290 nm-1330 nm (upstream) and 1480 nm-1500 nm (downstream). A filter plate 4 may be a band-pass filter plate with a pass band range of 1340 nm-1360 nm, or may be a sideband filter with a pass band range of less than or equal to 1360 nm. The filter plate 4 is used for transmission of light with wavelengths of 1340 nm-1360 nm (downstream), and for reflection of light with wavelengths of 1550 nm-1560 nm (upstream).

The working principles of WDM1r will be described hereafter. In the upstream direction, the wavelength division multiplexing signals input from the common port of WDM1r include G-PON upstream signals (1290 nm-1330 nm), XG-PON upstream signals (1260 nm-1280 nm), and NG-PON2 upstream signals (1550 nm-1560 nm).

The G-PON upstream signals enter from the common port of WDM1r to a common end of the filter plate 1, are transmitted by the filter plate 1 and then output to a common end of the filter plate 2, are reflected by the filter plate 2 and then output to a common end of the filter plate 3, and are reflected by the filter plate 3 and then output via the G-PON port. The XG-PON upstream signals enter from the common port of WDM1r to the common end of the filter plate 1, and are reflected by the filter plate 1 and then output via the XG-PON port. The NG-PON2 upstream signals enter from the common port of WDM1r to the common end of the filter plate 1, are transmitted by the filter plate 1 and then output to the common end of the filter plate 2, are reflected by the filter plate 2 and then output to the common end of the filter plate 3, are transmitted by the filter plate 3 and then output to a reflection end of the filter plate 4, and are reflected by the filter plate 4 and then output via a common end of the filter plate 4 to the NG-PON2 port.

In the downstream direction, WDM1r combines the downstream signals (1480 nm-1500 nm) entering into the G-PON port, the downstream signals (1575 nm-1580 nm) entering into the XG-PON port and the downstream signals (1340 nm-1360 nm) entering into the NG-PON2 port, and the combined signal is sent to the common port of WDM1r.

The G-PON downstream signals enter from the G-PON port of WDM1r to a reflection end of the filter plate 3, are reflected by the filter plate 3 and then output via the common end of the filter plate 3 to a reflection end of the filter plate 2, are reflected by the filter plate 2 and then output via the common end of the filter plate 2 to a transmission end of the filter plate 1, and are transmitted by the filter plate 1 and then output via the common end of the filter plate 1 to the common port of WDM1r.

The XG-PON downstream signals enter from the XG-PON port of WDM1r to a reflection end of the filter plate 1, and are reflected by the filter plate 1 and then output via the common end of the filter plate 1 to the common port of WDM1r.

The NG-PON2 downstream signals enter from the NG-PON2 port of WDM1r to the common end of the filter plate 4, are transmitted by the filter plate 4 and then output to a transmission end of the filter plate 2, are transmitted by the filter plate 2 and then output via the common end of the filter plate 2 to the transmission end of the filter plate 1, and are transmitted by the filter plate 1 and then output via the common end of the filter plate 1 to the common port of WDM1r.

Figure 7A:
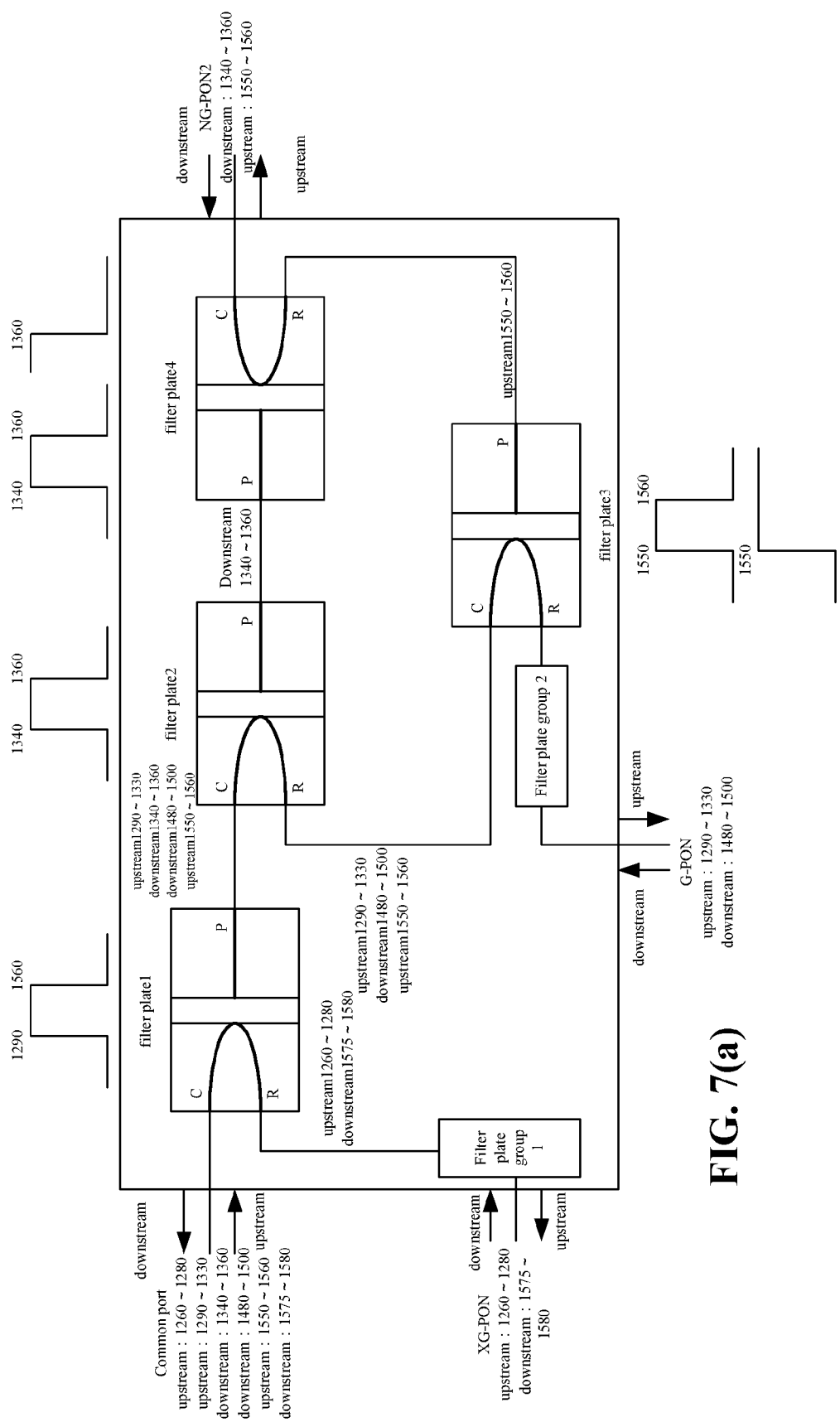
FIG. 7(a) shows a first architecture of a second schematic diagram illustrating the structure of WDM when GPON, XGPON1 and NGPON2 are in coexistence according to an embodiment of the disclosure.
Figure 7B:
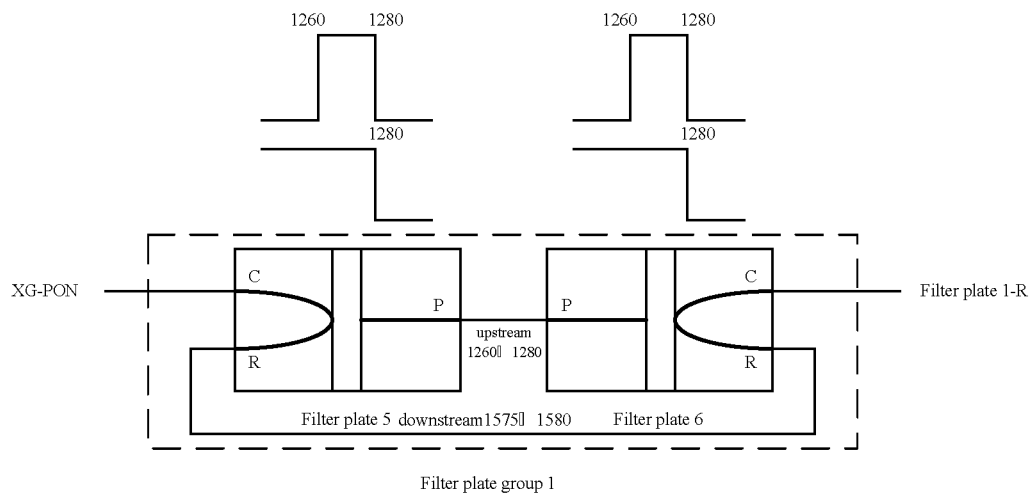
FIG. 7(b) shows a second architecture of the second schematic diagram illustrating the structure of WDM when GPON, XGPON1 and NGPON2 are in coexistence according to an embodiment of the disclosure.
Figure 7C:
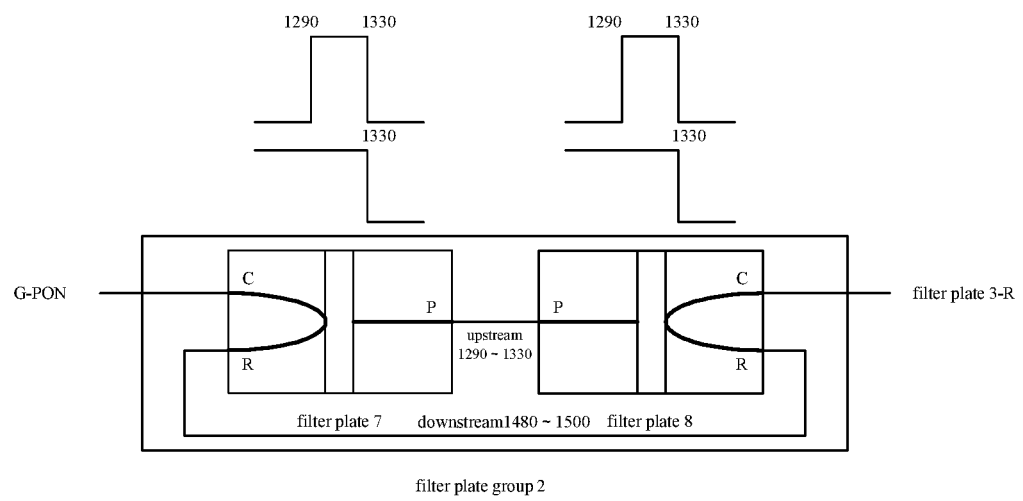
FIG. 7(c) shows a third architecture of the second schematic diagram illustrating the structure of WDM when GPON, XGPON1 and NGPON2 are in coexistence according to an embodiment of the disclosure.

FIG. 7(a) shows a first architecture of a second schematic diagram illustrating the structure of WDM when GPON, XGPON1 and NGPON2 are in coexistence according to an embodiment of the disclosure; FIG. 7(b) shows a second architecture of the second schematic diagram illustrating the structure of WDM when GPON, XGPON1 and NGPON2 are in coexistence according to an embodiment of the disclosure; and FIG. 7(c) shows a third architecture of the second schematic diagram illustrating the structure of WDM when GPON, XGPON1 and NGPON2 are in coexistence according to an embodiment of the disclosure. As shown in FIG. 7(a), FIG. 7(b) and FIG. 7(c), the design of the device can meet the requirements that the isolation between the upstream signals of each systems is greater than 30 dB. In this embodiment, the device is an enhanced WDM1r.

The working principles of the enhanced WDM1r will be described hereafter. With respect to the basic WDM1r, a filter 5 and a filter 6 are added to the enhanced WDM1r, wherein the filter 5 and the filter 6 are located between the XG-PON port and the reflection end of the filter 1, so that the isolation between the XG-PON upstream channel (1260 nm-1280 nm) and the other channel is increased. Meanwhile, a filter 7 and filter 8 are added between the G-PON port and the reflection end of the filter 3, so that the isolation between the G-PON upstream channel (1290 nm-1330 nm) and the other channel is increased.

The filter plate 5 may be a band-pass filter plate with a pass band range of 1260 nm-1280 nm, or may be a sideband filter with a pass band range of less than or equal to 1280 nm. The filter plate 6 may be a band-pass filter plate with a pass band range of 1260 nm-1280 nm, or may be a sideband filter with a pass band range of less than or equal to 1280 nm. The filter plate 7 may be a band-pass filter plate with a pass band range of 1290 nm-1330 nm, or may be a sideband filter with a pass band range of less than or equal to 1330 nm. The filter plate 8 may be a band-pass filter plate with a pass band range of 1290 nm-1330 nm, or may be a sideband filter with a pass band range of less than or equal to 1330 nm.

In the upstream direction: the XG-PON upstream signals (1260 nm-1280 nm) input from the common port of WDM1r enter to the common end of the filter plate 1, are reflected by the filter plate 1 and then output to a common end of the filter plate 6, are transmitted by the filter plate 6 and then enter from a transmission end of the filter plate 6 to a transmission end of the filter plate 5, and are transmitted by the filter plate 5 and then output from a common end of the filter plate 5 to the XG-PON port. The G-PON upstream signals (1290 nm-1330 nm) input from the common port of WDM1r enter to the common end of the filter plate 1, are transmitted by the filter plate 1 and then enter to the common end of the filter plate 2, are reflected by the filter plate 2 and then output to the common end of the filter plate 3, are reflected by the filter plate 3 and then output to a common end of the filter plate 8, are transmitted by the filter plate 8 and then enter from a transmission end of the filter plate 8 to a transmission end of the filter plate 7, and are transmitted by the filter plate 7 and then output from a common end of the filter plate 7 to the G-PON port.

In the downstream direction: the XG-PON downstream signals (1575 nm-1580 nm) input from the XG-PON port of WDM1r enter to the common end of the filter plate 5, are reflected by the filter plate 5 and then output to the reflection end of the filter plate 6, are reflected by the filter plate 6 and then enter from the common end of the filter plate 6 to the reflection end of the filter plate 1, and are reflected by the filter plate 1 and then output from the common end of the filter plate 1 to the common port of WDM1r. The G-PON downstream signals (1480 nm-1500 nm) input from the G-PON port of WDM1r enter to the common end of the filter plate 7, are reflected by the filter plate 7 and then output to a reflection end of the filter plate 8, are reflected by the filter plate 8 and then enter from the common end of the filter plate 8 to the reflection end of the filter plate 3, are reflected by the filter plate 3 and then output from the common end of the filter plate 3 to the reflection end of the filter plate 2, are reflected by the filter plate 2 and then output from the common end of the filter plate 2 to the transmission end of the filter plate 1, and are transmitted by the filter plate 1 and then output from the common end of the filter plate 1 to the common port of WDM1r.

Figure 8:
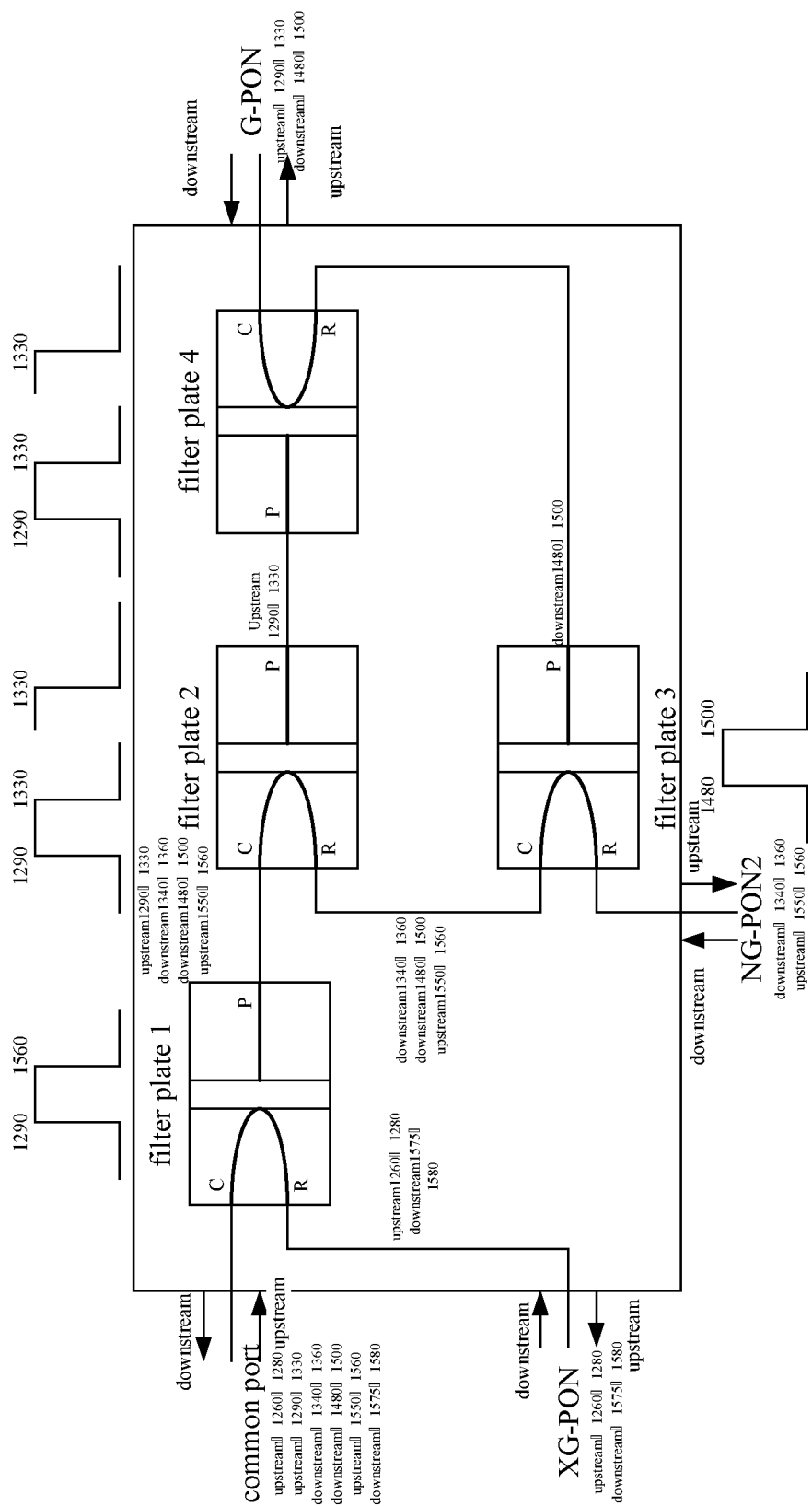
FIG. 8 shows a third schematic diagram illustrating the structure of WDM when GPON, XGPON1 and NGPON2 are in coexistence according to an embodiment of the disclosure.

FIG. 8 shows a third schematic diagram illustrating the structure of WDM when GPON, XGPON1 and NGPON2 are in coexistence according to an embodiment of the disclosure. As shown in FIG. 8, the bands of wavelength division and wavelength combination required by this WDM1r include: 1260 nm-1280 nm (upstream), 1290 nm-1330 nm (upstream), 1340 nm-1360 nm (downstream), 1480 nm-1500 nm (downstream), 1550 nm-1560 nm (upstream), and 1575 nm-1580 nm (downstream).

The description of the ports of WDM1r is in that: WDM1r in this application is a 4-port device, comprising: a common port, a G-PON port, an XG-PON port and an NG-PON2 port.

The common port is connected to a fiber backbone, with operating wavelengths including 1260 nm-1280 nm (upstream), 1290 nm-1330 nm (upstream), 1340 nm-1360 nm (downstream), 1480 nm-1500 nm (downstream), 1550 nm-1560 nm (upstream), and 1575 nm-1580 nm (downstream).

The G-PON port is connected to an OLT optical port of a G-PON system, with operating wavelengths including 1290 nm-1330 nm (upstream) and 1480 nm-1500 nm (downstream).

The XG-PON port is connected to an OLT optical port of a XG-PON system, with operating wavelengths including 1260 nm-1280 nm (upstream) and 1575 nm-1580 nm (downstream).

The NG-PON2 port is connected to an OLT optical port of a NG-PON2 system, with operating wavelengths including 1550 nm-1560 nm (upstream) and 1340 nm-1360 nm (downstream).

Filter plates inside WDM1r will be described hereafter. A filter plate 1 is a band-pass filter plate with a pass band range of 1290 nm-1560 nm, and is used for transmission of light with wavelengths of 1290 nm-1330 nm (upstream), 1340 nm-1360 nm (downstream), 1480 nm-1500 nm (downstream), and 1550 nm-1560 nm (upstream), and for reflection of light with wavelengths of 1260 nm-1280 nm (upstream) and 1575 nm-1580 nm (downstream). A filter plate 2 may be a band-pass filter plate with a pass band range of 1290 nm-1330 nm, or may be a sideband filter with a pass band range of less than or equal to 1330 nm. The filter plate 2 is used for transmission of light with wavelengths of 1290 nm-1330 nm (upstream), and for reflection of light with wavelengths of 1340 nm-1360 nm (downstream), 1480 nm-1500 nm (downstream), and 1550 nm-1560 nm (upstream). A filter plate 3 is a band-pass filter plate with a pass band range of 1480 nm-1500 nm. The filter plate 3 is used for transmission of light with wavelengths of 1480 nm-1500 nm (downstream), and for reflection of light with wavelengths of 1340 nm-1360 nm (downstream) and 1550 nm-1560 nm (upstream). A filter plate 4 may be a band-pass filter plate with a pass band range of 1290 nm-1330 nm, or may be a sideband filter with a pass band range of less than or equal to 1330 nm. The filter plate 4 is used for transmission of light with wavelengths of 1290 nm-1330 nm (upstream), and for reflection of light with wavelengths of 1480 nm-1500 nm (downstream).

The working principle of WDM1r shown in FIG. 8 is described hereafter. In the upstream direction, the wavelength division multiplexing signals input from the common port of WDM1r include G-PON upstream signals (1290 nm-1330 nm), XG-PON upstream signals (1260 nm-1280 nm) and NG-PON2 upstream signals (1550 nm-1560 nm).

The G-PON upstream signals enter from the common end of WDM1r to a common end of the filter plate 1, are transmitted by the filter plate 1 and then output to a common end of the filter plate 2, are transmitted by the filter plate 2 and then output to a transmission end of the filter plate 4, and are transmitted by the filter plate 4 and then output via a common end of the filter plate 4 to the G-PON port. The XG-PON upstream signals enter from the common end of WDM1r to the common end of the filter plate 1, and are reflected by the filter plate 1 and then output via the XG-PON port. The NG-PON2 upstream signals enter from the common end of WDM1r to the common end of the filter plate 1, are transmitted by the filter plate 1 and then output to the common end of the filter plate 2, reflected by the filter plate 2 and then output to a common end of the filter plate 3, and then are reflected by the filter plate 3 and output from a reflection end of the filter plate 3 to the NG-PON2 port.

In the downstream direction, WDM1r combines the downstream signals (1480 nm-1500 nm) entering into the G-PON port, the downstream signals (1575 nm-1580 nm) entering into the XG-PON port and the downstream signals (1340 nm-1360 nm) entering into the NG-PON2 port, and the combined signals are sent to the common port of WDM1r.

The G-PON downstream signals enter from the G-PON port of WDM1r to the common end of the filter plate 4, are reflected by the filter plate 4 and then output from a reflection end of the filter plate 4 to a transmission end of the filter plate 3, are transmitted by the filter plate 3 and then output from the common end of the filter plate 3 to a reflection end of the filter plate 2, reflected by the filter plate 2 and then output from the common end of the filter plate 2 to the transmission end of the filter plate 1, and are transmitted by the filter plate 1 and then output from the common end of the filter plate 1 to the common port of WDM1r.

The XG-PON downstream signals enter from the XG-PON port of WDM1r to a reflection end of the filter plate 1, and are reflected by the filter plate 1 and then output via the common end of the filter plate 1 to the common port of WDM1r.

The NG-PON2 downstream signals enter from the NG-PON2 port of WDM1r to the reflection end of the filter plate 3, are reflected by the filter plate 3 and then output to the reflection end of the filter plate 2, are reflected by the filter plate 2 and then output from the common end of the filter plate 2 to the transmission end of the filter plate 1, and are transmitted by the filter plate 1 and then output from the common end of the filter plate 1 to the common port of WDM1r.

Figure 9A:
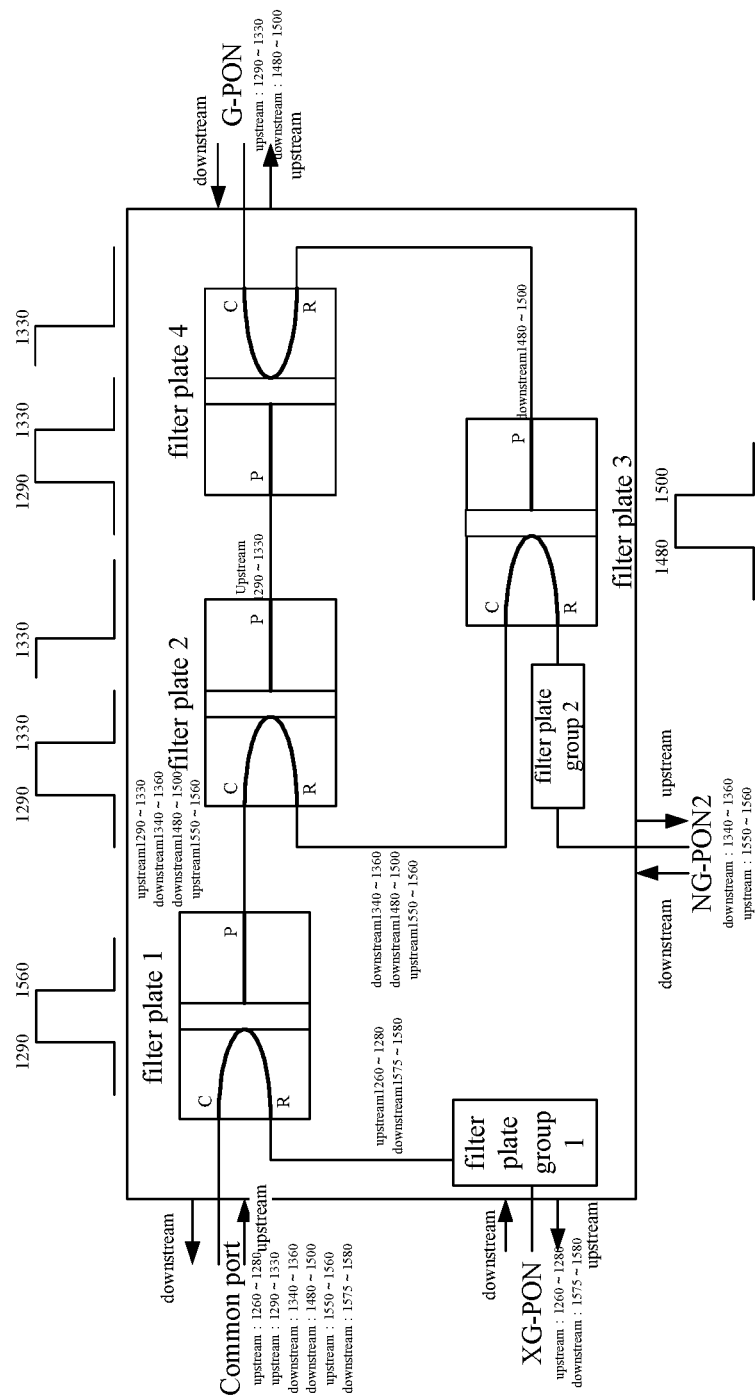
FIG. 9(a) shows a first architecture of a fourth schematic diagram illustrating the structure of WDM when GPON, XGPON1 and NGPON2 are in coexistence according to an embodiment of the disclosure.
Figure 9B:
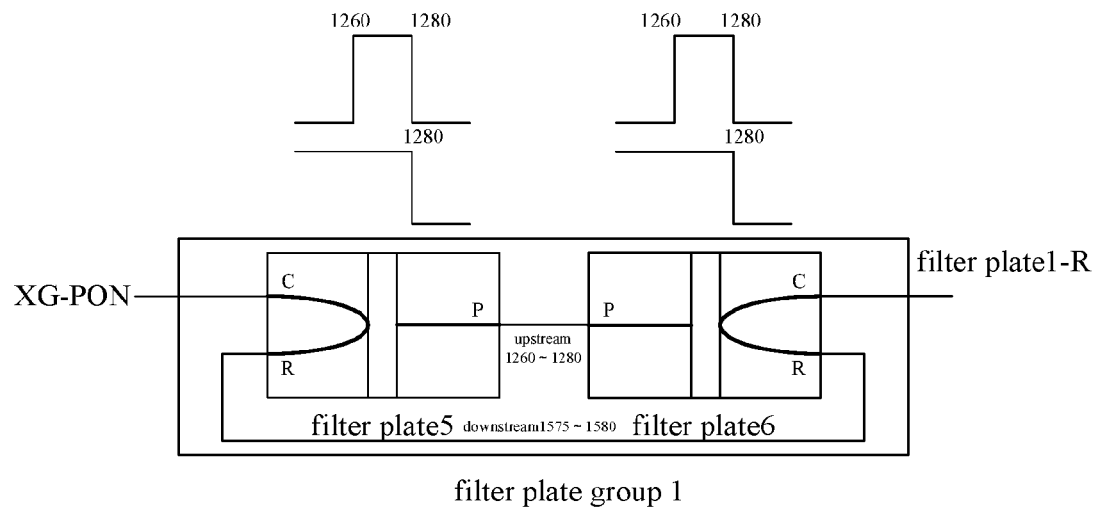
FIG. 9(b) shows a second architecture of the fourth schematic diagram illustrating the structure of WDM when GPON, XGPON1 and NGPON2 are in coexistence according to an embodiment of the disclosure.
Figure 9C:
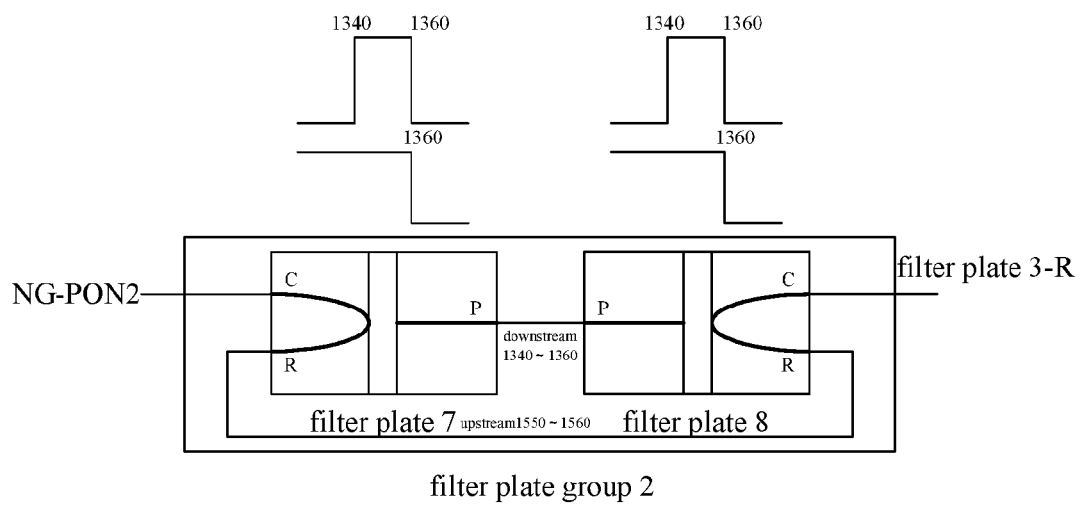
FIG. 9(c) shows a third architecture of the fourth schematic diagram illustrating the structure of WDM when GPON, XGPON1 and NGPON2 are in coexistence according to an embodiment of the disclosure.

FIG. 9(a) shows a first architecture of a fourth schematic diagram illustrating the structure of WDM when GPON, XGPON1 and NGPON2 are in coexistence according to an embodiment of the disclosure; FIG. 9(b) shows a second architecture of the fourth schematic diagram illustrating the structure of WDM when GPON, XGPON1 and NGPON2 are in coexistence according to an embodiment of the disclosure; and FIG. 9(c) shows a third architecture of the fourth schematic diagram illustrating the structure of WDM when GPON, XGPON1 and NGPON2 are in coexistence according to an embodiment of the disclosure. As shown in FIG. 9(a), FIG. 9(b) and FIG. 9(c), the working principles of the enhanced WDM1r will be described hereafter. With respect to the basic WDM1r, the enhanced WDM1r is added with a filter 5 and a filter 6 between the XG-PON port and the reflection end of the filter 1, so that isolation between the XG-PON upstream channel (1260 nm-1280 nm) and the other channel is increased. Meanwhile, a filter 7 and a filter 8 are added between the NG-PON2 port and the reflection end of the filter 3, so that the isolation between the NG-PON2 downstream channel (1340 nm-1360 nm) and the other channel is increased.

The filter plate 5 may be a band-pass filter plate with a pass band range of 1260 nm-1280 nm, or may be a sideband filter with a pass band range of less than or equal to 1280 nm. The filter plate 6 may be a band-pass filter plate with a pass band range of 1260 nm-1280 nm, or may be a sideband filter with a pass band range of less than or equal to 1280 nm. The filter plate 7 may be a band-pass filter plate with a pass band range of 1340 nm-1360 nm, or may be a sideband filter with a pass band range of less than or equal to 1360 nm. The filter plate 8 may be a band-pass filter plate with a pass band range of 1340 nm-1360 nm, or may be a sideband filter with a pass band range of less than or equal to 1360 nm.

In the upstream direction: the XG-PON upstream signals (1260 nm-1280 nm) input from the common port of WDM1r enter to the common end of the filter plate 1, are reflected by the filter plate 1 and then output to a common end of the filter plate 6, are transmitted by the filter plate 6 and then enter from a transmission end of the filter plate 6 to a transmission end of the filter plate 5, and are transmitted by the filter plate 5 and then output from a common end of the filter plate 5 to the XG-PON port. The NG-PON2 upstream signals (1550 nm-1560 nm) input from the common port of WDM1r enter to the common end of the filter plate 1, are transmitted by the filter plate 1 and then enter to the common end of the filter plate 2, are reflected by the filter plate 2 and then output to the common end of the filter plate 3, are reflected by the filter plate 3 and then output to a common end of the filter plate 8, are reflected by the filter plate 8 and then enter from a reflection end of the filter plate 8 to a reflection end of the filter plate 7, and are reflected by the filter plate 7 and then output from the common end of the filter plate 7 to the NG-PON2 port.

In the downstream direction: the XG-PON downstream signals (1575 nm-1580 nm) input from the XG-PON port of WDM1r enter to the common end of the filter plate 5, are reflected by the filter plate 5 and then output to the reflection end of the filter plate 6, are reflected by the filter plate 6 and then enter from the common end of the filter plate 6 to the reflection end of the filter plate 1, and are reflected by the filter plate 1 and then output from the common end of the filter plate 1 to the common port of WDM1r. The NG-PON2 downstream signals (1340 nm-1360 nm) input from the NG-PON2 port of WDM1r enter to the common end of the filter plate 7, are transmitted by the filter plate 7 and then output to a transmission end of the filter plate 8, are transmitted by the filter plate 8 and then enter from the common end of the filter plate 8 to the reflection end of the filter plate 3, are reflected by the filter plate 3 and then output from the common end of the filter plate 3 to the reflection end of the filter plate 2, are reflected by the filter plate 2 and then output from the common end of the filter plate 2 to the transmission end of the filter plate 1, and are transmitted by the filter plate 1 and then output from the common end of the filter plate 1 to the common port of WDM1r.

In this embodiment, when NGPON2 coexists with GPON and XGPON1, the upstream wavelength band of NGPON2 is in the range of 1550 to 1560 nm, the downstream wavelength band of NGPON2 is in the range of 1310 nm and 1480 nm, preferably in the range of 1340 nm and 1360 nm. In other embodiments, when NGPON2 coexists with GPON and XGPON1, the upstream wavelength band of NGPON2 may be in the range of 1500 nm and 1550 nm, preferably in the range of 1520 nm and 1530 nm, or the upstream wavelength band of NGPON2 is in the range of 1580 nm and 1625 nm, preferably in the range of 1580 nm and 1600 nm, or the upstream wavelength band of NGPON2 is in the range of 1560 nm and 1575 nm; and the upstream wavelength band of NGPON2 is in the range of 1550 to 1560 nm.

Preferred Embodiment 4

This preferred embodiment 4 describes the case of coexistence of GPON, XGPON1, NGPON2 and Video.

Figure 10:
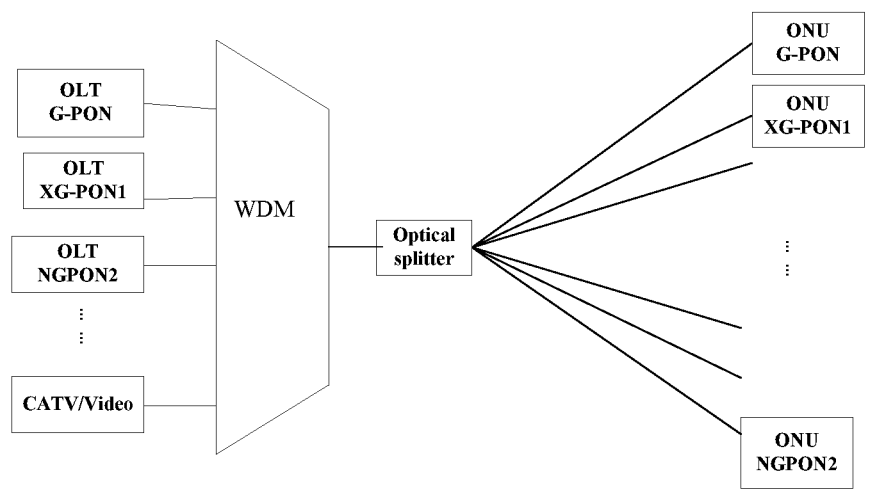
FIG. 10 shows a schematic diagram illustrating the system architecture of coexistence of GPON, XGPON1, NGPON2 and Video according to an embodiment of the disclosure.

FIG. 10 shows a schematic diagram illustrating the system architecture of coexistence of GPON, XGPON1, NGPON2 and Video according to an embodiment of the disclosure, wherein the upstream wavelength band of NGPON2 is in the range of 1500 nm and 1550 nm, preferably in the range of 1520 nm and 1530 nm, and the downstream wavelength band is in the range of 1310 nm and 1480 nm, preferably in the range of 1340 nm and 1360 nm.

As shown in FIG. 10, after the downstream signals of GPON, XG-PON1 and NGPON2 and the downstream signals of Video are combined via five ports of WDM respectively, the combined signal is transmitted in optical fiber to an optical splitter and reaches ONUS via the optical splitter. A filter plate is provided at each of GPON, XG-PON1 and NGPON2, and the filter plate at the ONU in the GPON system filters out the downstream signals of XG-PON1 and NGPON2 and the signals of Video and only receives the downstream signals of GPON. If the ONU is only required to receive the signals of Video, the filter plate at the ONU in the GPON system filters out the downstream signals of XGPON1 and NGPON2 and the downstream signals of GPON, and only receives the downstream signals of Video. If the ONU is required to receive the signals of Video and the downstream signals of GPON, two receivers are provided at the ONU, the filter plate of one receiver filtering out the downstream signals of XGPON1 and NGPON2 and the downstream signals of GPON and only receiving the downstream signals of Video, the filter plate of the other receiver filtering out the downstream signals of XGPON1 and NGPON2 and the signals of Video and only receiving the downstream signals of GPON.

The filter plate at the ONU in the XG-PON1 system filters out the downstream signals of GPON and NGPON2 and the signals of Video, and only receives the downstream signals of XG-PON1. If the ONU is only required to receive the signals of Video, the filter plate at the ONU in the XG-PON1 system filters out the downstream signals of GPON, NGPON2 and the downstream signals of XG-PON1, and only receives the downstream signals of Video. If the ONU is required to receive the signals of Video and the downstream signals of XG-PON1, two receivers are provided at the ONU, the filter plate of one receiver filtering out the downstream signals of GPON and NGPON2 and the downstream signals of XG-PON1 and only receiving the downstream signals of Video, the filter plate of the other receiver filtering out the downstream signals of GPON and NGPON2 and the signals of Video and only receiving the downstream signals of XG-PON1. The filter plate at the ONU in the NGPON2 system filters out the downstream signals of GPON and XG-PON1 and the signals of Video, and only receives the downstream signals of NGPON2. If the ONU is only required to receive the signals of Video, the filter plate at the ONU in the NGPON2 system filters out the downstream signals of GPON and XG-PON1 and the downstream signals of NGPON2, and only receives the downstream signals of Video. If the ONU is only required to receive the signals of Video and the downstream signals of NGPON2, two receivers are provided at the ONU, the filter plate of one receiver filtering out the downstream signals of GPON and XG-PON1 and the downstream signals of NGPON2 and only receiving the downstream signals of Video, the filter plate of the other receiver filtering out the downstream signals of GPON and XG-PON1 and the signals of Video and only receiving the downstream signals of NGPON2. The upstream signals sent from the ONUs of GPON, XG-PON1 and NGPON2 are transmitted via the ODN, and then input to the corresponding OLTs via the ports of the wavelength division multiplexer corresponding to GPON, XG-PON1 and NGPON2.

Figure 11:
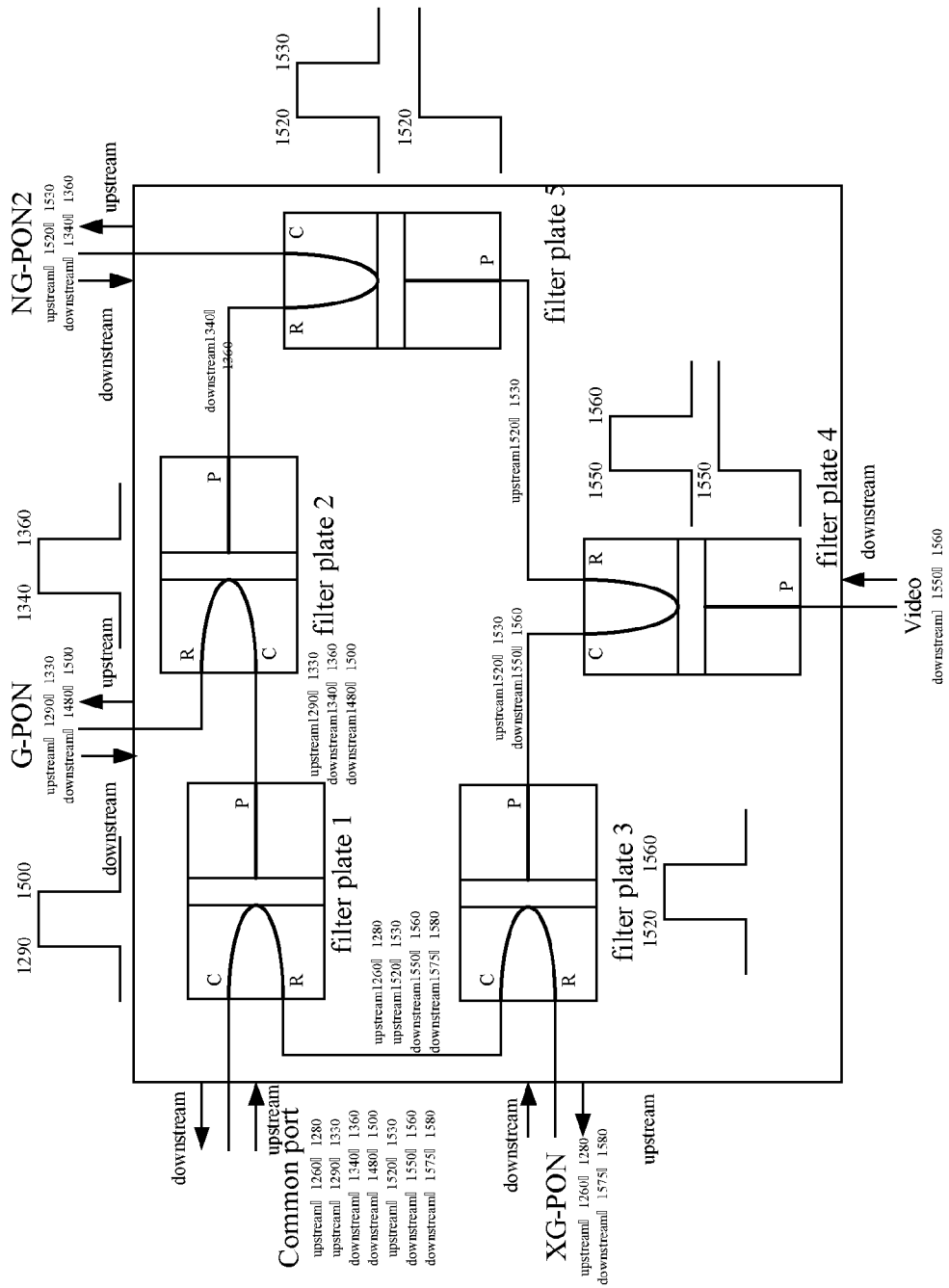
FIG. 11 shows a first schematic diagram of the structure of WDM when GPON, XGPON1, NGPON2 and Video are in coexistence according to an embodiment of the disclosure.

FIG. 11 shows a first schematic diagram of the structure of WDM when GPON, XGPON1, NGPON2 and Video are in coexistence according to an embodiment of the disclosure. As shown in FIG. 11, the function of WDM1r in the PON system is that: when the existing TDM-PON is evolved to NG-PON2, if all the existing PON systems need to coexist with NG-PON2, WDM1r is required to have a function to divide and combine the upstream/downstream wavelength bands of all PON systems to ensure the independent transmission therebetween.

For this purpose, the bands of wavelength division and wavelength combination required by this WDM1r include: 1260 nm-1280 nm (upstream), 1290 nm-1330 nm (upstream), 1340 nm-1360 nm (downstream), 1480 nm-1500 nm (downstream), 1520 nm-1530 nm (upstream), 1550 nm-1560 nm (downstream), and 1575 nm-1580 nm (downstream).

The description of the ports of WDM1r will be described hereafter. WDM1r is a 5-port device and comprises a common port, a G-PON port, an XG-PON port, an NG-PON2 port and a Video port.

The common port is connected to a fiber backbone, with operating wavelengths including 1260 nm-1280 nm (upstream), 1290 nm-1330 nm (upstream), 1340 nm-1360 nm (downstream), 1480 nm-1500 nm (downstream), 1520 nm-1530 nm (upstream), 1550 nm-1560 nm (downstream), and 1575 nm-1580 nm (downstream).

The G-PON port is connected to an OLT optical port of the G-PON system, with operating wavelengths including 1290 nm-1330 nm (upstream) and 1480 nm-1500 nm (downstream).

The XG-PON port is connected to an OLT optical port of the XG-PON system, with operating wavelengths including 1260 nm-1280 nm (upstream) and 1575 nm-1580 nm (downstream).

The NG-PON2 port is connected to an OLT optical port of the NG-PON2 system, with operating wavelengths including 1520 nm-1530 nm (upstream) and 1340 nm-1360 nm (downstream).

The Video port is connected to a Video optical port, with operating wavelengths of 1550 nm-1560 nm (downstream).

The filter plates inside WDM1r will be described hereafter. A filter plate 1 is a band-pass filter plate with a pass band range of 1290 nm-1500 nm, and is used for transmission of light with wavelengths of 1290 nm-1330 nm (upstream), 1340 nm-1360 nm (downstream), and 1480 nm-1500 nm (downstream), and for reflection of light with wavelengths of 1260 nm-1280 nm (upstream), 1520 nm-1530 nm (upstream), 1550 nm-1560 nm (downstream), and 1575 nm-1580 nm (downstream). A filter plate 2 is a band-pass filter plate with a pass band range of 1340 nm-1360 nm, and is used for transmission of light with wavelengths of 1340 nm-1360 nm (downstream), and for reflection of light with wavelengths of 1290 nm-1330 nm (upstream) and 1480 nm-1500 nm (downstream). A filter plate 3 is a band-pass filter plate with a pass band range of 1520 nm-1560 nm, and is used for transmission of light with wavelengths of 1520 nm-1530 nm (upstream) and 1550 nm-1560 nm (downstream), and for reflection of light with wavelengths of 1260 nm-1280 nm (upstream) and 1575 nm-1580 nm (downstream). A filter plate 4 may be a band-pass filter plate with a pass band range of 1550 nm-1560 nm, or may be a sideband filter with a pass band range of more than or equal to 1550 nm. The filter plate 4 is used for transmission of light with wavelengths of 1550 nm-1560 nm (downstream), and for reflection of light with wavelengths of 1520 nm-1530 nm (upstream). A filter plate 5 may be a band-pass filter plate with a pass band range of 1520 nm-1530 nm, or may be a sideband filter with a pass band range of more than or equal to 1520 nm. The filter plate 5 is used for transmission of light with wavelengths of 1520 nm-1530 nm (upstream), and for reflection of light with wavelengths of 1340 nm-1360 nm (downstream).

The working principles of WDM1r will be described hereafter. In the upstream direction, the wavelength division multiplexing signals input from the common port of WDM1r include G-PON upstream signals (1290 nm-1330 nm), XG-PON upstream signals (1260 nm-1280 nm) and NG-PON2 upstream signals (1520 nm-1530 nm).

The G-PON upstream signals enter from the common port of WDM1r to a common end of the filter plate 1, are transmitted by the filter plate 1 and then output to a common end of the filter plate 2, and are reflected by the filter plate 2 and then output from the G-PON port. The XG-PON upstream signals enter from the common port of WDM1r to the common end of the filter plate 1, are reflected by the filter plate 1 and then output to a common end of the filter plate 3, and are reflected by the filter plate 3 and output from the XG-PON port. The NG-PON2 upstream signals enter from the common port of WDM1r to the common end of the filter plate 1, are reflected by the filter plate 1 and then output to the common end of the filter plate 3, are transmitted by the filter plate 3 and then output to a common end of the filter plate 4, are reflected by the filter plate 4 and then output to a transmission end of the filter plate 5, and are transmitted by the filter plate 5 and then output from the common end of the filter plate 5 to the NG-PON2 port.

In the downstream direction, WDM1r combines the downstream signals (1480 nm-1500 nm) entering into the G-PON port, the downstream signals (1575 nm-1580 nm) entering into the XG-PON port, the downstream signal (1340 nm-1360 nm) entering into the NG-PON2 port and the downstream signal (1550 nm-1560 nm) entering into the Video port, and the combined signal is sent to the common port of WDM1r.

The G-PON downstream signals enter from the G-PON port of WDM1r to a reflection end of the filter plate 2, are reflected by the filter plate 2 and then output from the common end of the filter plate 2 to a transmission end of the filter plate 1, and are transmitted by the filter plate 1 and then output from the common end of the filter plate 1 to the common port of WDM1r. The XG-PON downstream signals enter from the XG-PON port of WDM1r to a reflection end of the filter plate 3, are reflected by the filter plate 3 and then output from the common end of the filter plate 3 to a reflection end of the filter plate 1, and are reflected by the filter plate 1 and then output from the common end of the filter plate 1 to the common port of WDM1r. The NG-PON2 downstream signals enter from the NG-PON2 port of WDM1r to the common end of the filter plate 5, are reflected by the filter plate 5 and then output from a reflection end of the filter plate 5 to a transmission end of the filter plate 2, are transmitted by the filter plate 2 and then output via the common end of the filter plate 2 to the transmission end of the filter plate 1, and are transmitted by the filter plate 1 and then output via the common end of the filter plate 1 to the common port of WDM1r. The Video downstream signals enter from the Video port of WDM1r to a transmission end of the filter plate 4, are transmitted by the filter plate 4 and then output from the common end of the filter plate 4 to a transmission end of the filter plate 3, are transmitted by the filter plate 3 and then output from the common end of the filter plate 3 to the reflection end of the filter plate 1, and are reflected by the filter plate 1 and then output via the common end of the filter plate 1 to the common port of WDM1r.

Figure 12:
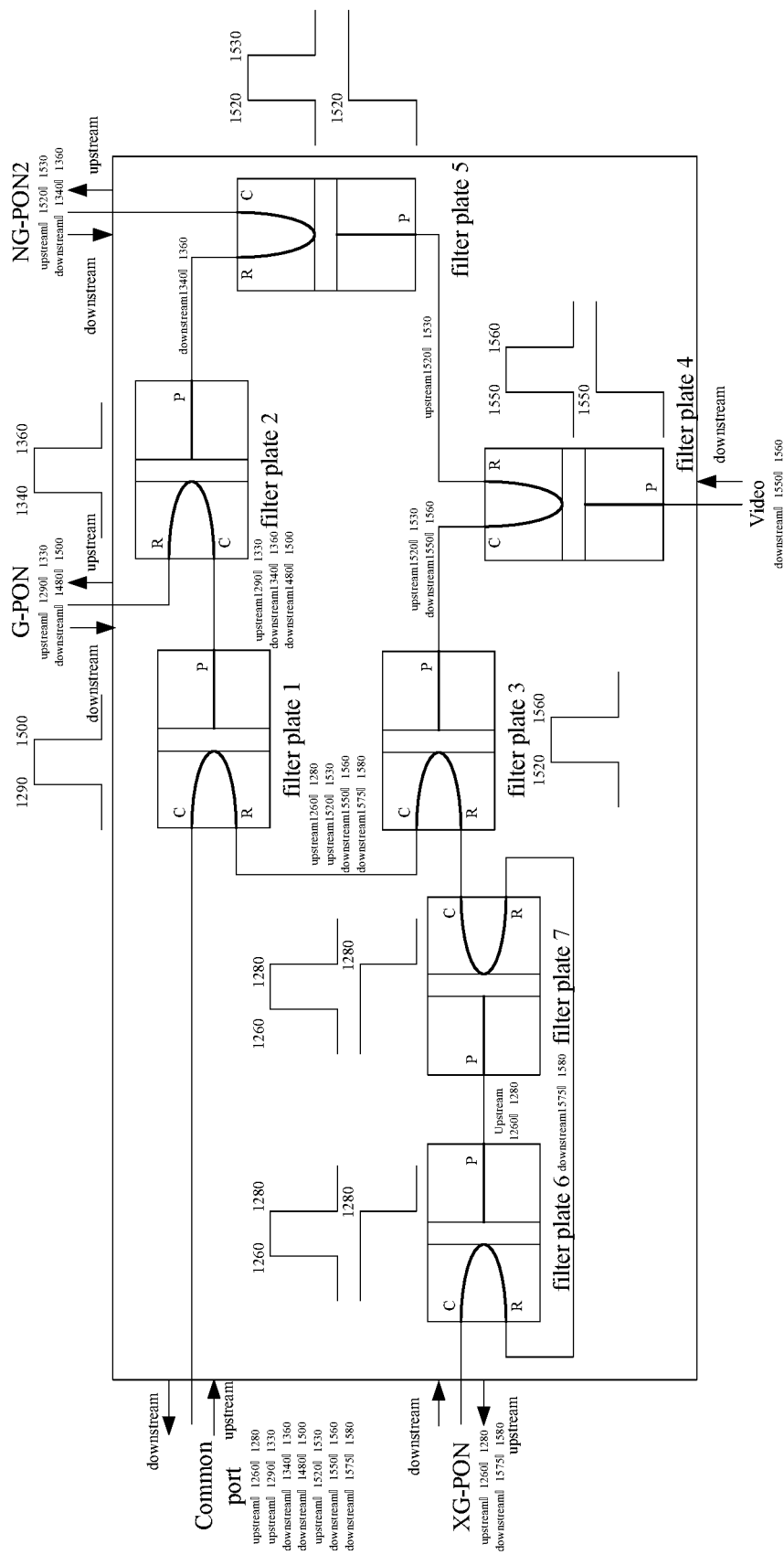
FIG. 12 shows a second schematic diagram of the structure of WDM when GPON, XGPON1, NGPON2 and Video are in coexistence according to an embodiment of the disclosure.

FIG. 12 shows a second schematic diagram of the structure of WDM when GPON, XGPON1, NGPON2 and Video are in coexistence according to an embodiment of the disclosure. As shown in FIG. 12, the design of the device can meet the requirements that the isolation between the upstream signals of the systems is greater than 30 dB. In this embodiment, the device is an enhanced WDM1r.

The working principles of the enhanced WDM1r will be described hereafter. With respect to the basic WDM1r, the enhanced WDM1r is added with a filter 6 and a filter 7 between the XG-PON port and the reflection end of the filter 3, so that the isolation between the XG-PON upstream channel (1260 nm-1280 nm) and the other channel is increased.

The filter plate 6 may be a band-pass filter plate with a pass band range of 1260 nm-1280 nm, or may be a sideband filter with a pass band range of less than or equal to 1280 nm. The filter plate 7 may be a band-pass filter plate with a pass band range of 1260 nm-1280 nm, or may be a sideband filter with a pass band range of less than or equal to 1280 nm.

In the upstream direction, the XG-PON upstream signals (1260 nm-1280 nm) input from the common port of WDM1r enter into the common end of the filter plate 1, are reflected by the filter plate 1 and then output to the common end of the filter plate 3, are reflected by the filter plate 3 and enter to the common end of the filter plate 7, are transmitted by the filter plate 7 and then enter from a transmission end of the filter plate 7 to a transmission end of the filter plate 6, and transmitted by the filter plate 6 and then output from a common end of the filter plate 6 to the XG-PON port.

In the downstream direction, the XG-PON downstream signals (1575 nm-1580 nm) input from the XG-PON port of WDM1r enter to the common end of the filter plate 6, are reflected by the filter plate 6 and then output to a reflection end of the filter plate 7, are reflected by the filter plate 7 and then enter from the common end of the filter plate 7 to the reflection end of the filter plate 3, are reflected by the filter plate 3 and then enter from the common end of the filter plate 3 to the reflection end of the filter plate 1, and are reflected by the filter plate 1 and then output from the common end of the filter plate 1 to the common port of WDM1r.

In this embodiment, NGPON2 may coexist with GPON, XGPON1 and Video, and in other embodiments, through the WDM device proposed in this embodiment, NGPON2, GPON, XGPON1 and Video may implement a coexistence system in any combination.

In this embodiment, NGPON2 may coexist with GPON, XGPON1 and Video, and in other embodiments, it is necessary to consider the coexistence of any three systems selected from NGPON2, GPON, XGPON1 and Video according to actual requirements, which may simplify the structure of WDM and improve the performance of each system. The following describes an example of the NGPON2 wavelength setting and the WDM structure when NGPON2 coexists with GPON and XGPON1. The system architecture when NGPON2 coexists with GPON and XGPON1 is shown in FIG. 4, with the downstream wavelength band of NGPON2 being in the range of 1340 nm to 1360 nm and the upstream wavelength band of NGPON2 being in the range of 1580 nm to 1600 nm.

Figure 13:
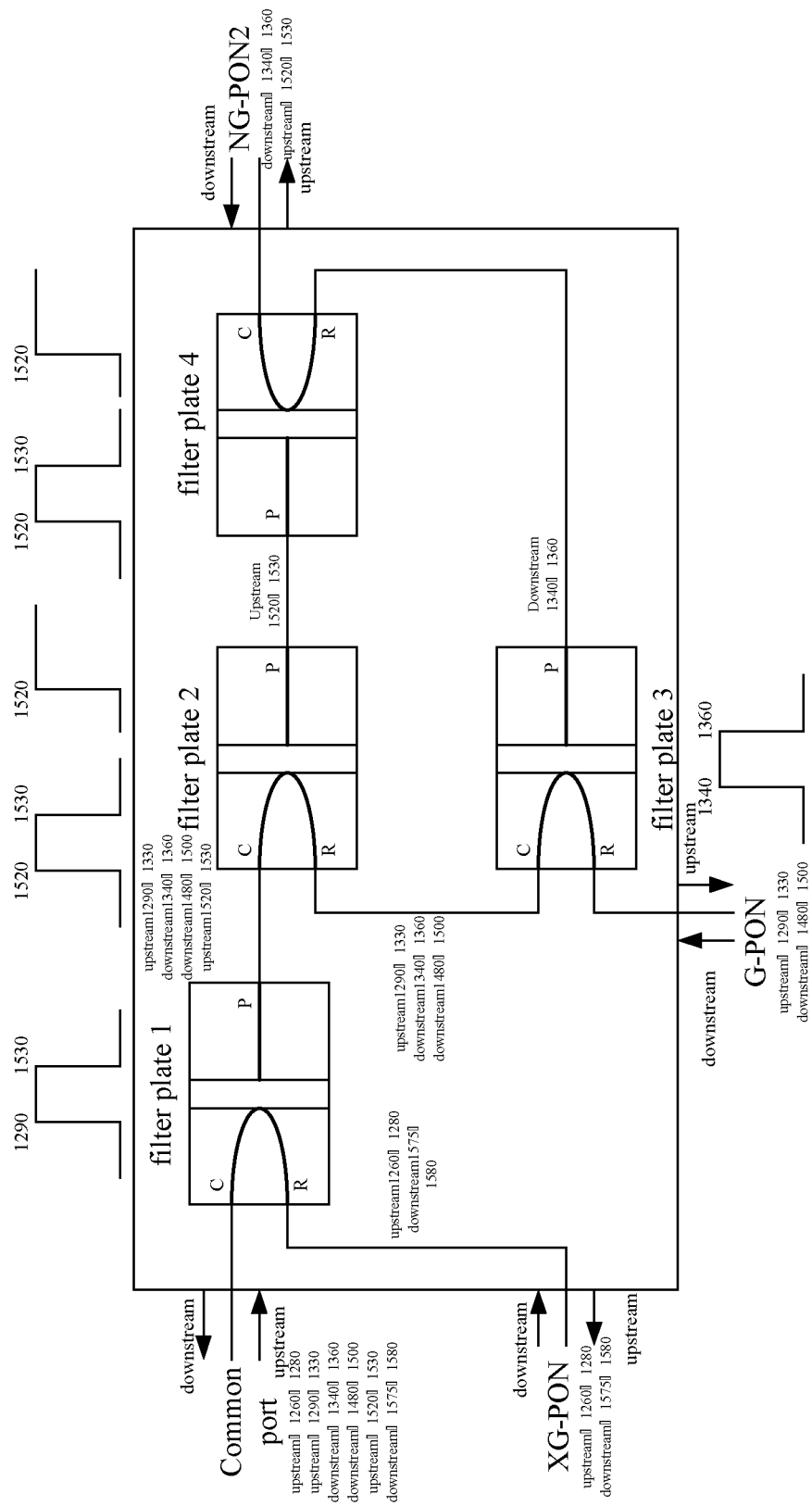
FIG. 13 shows a third schematic diagram of the structure of WDM when GPON, XGPON1, NGPON2 and Video are in coexistence according to an embodiment of the disclosure.

FIG. 13 shows a third schematic diagram of the structure of WDM when GPON, XGPON1, NGPON2 and Video are in coexistence according to an embodiment of the disclosure. As shown in FIG. 13, the bands of wavelength division and wavelength combination required by this WDM1r include: 1260 nm-1280 nm (upstream), 1290 nm-1330 nm (upstream), 1340 nm-1360 nm (downstream), 1480 nm-1500 nm (downstream), 1520 nm-1530 nm (upstream), and 1575 nm-1580 nm (downstream).

The ports of WDM1r will be described hereafter. WDM1r in this application is a 4-port device and comprises a common port, a G-PON port, an XG-PON port and an NG-PON2 port.

The common port is connected to a fiber backbone, with operating wavelengths including 1260 nm-1280 nm (upstream), 1290 nm-1330 nm (upstream), 1340 nm-1360 nm (downstream), 1480 nm-1500 nm (downstream), 1520 nm-1530 nm (upstream), and 1575 nm-1580 nm (downstream).

The G-PON port is connected to an OLT optical port of a G-PON system, with operating wavelengths including 1290 nm-1330 nm (upstream) and 1480 nm-1500 nm (downstream).

The XG-PON port is connected to an OLT optical port of a XG-PON system, with operating wavelengths including 1260 nm-1280 nm (upstream) and 1575 nm-1580 nm (downstream).

The NG-PON2 port is connected to an OLT optical port of a NG-PON2 system, with operating wavelengths including 1520 nm-1530 nm (upstream) and 1340 nm-1360 nm (downstream).

The filter plates inside WDM1r will be described hereafter. A filter plate 1 is a band-pass filter plate, with a pass band range of 1290 nm-1530 nm, and used for transmission of light with wavelengths of 1290 nm-1330 nm (upstream), 1340 nm-1360 nm (downstream), 1480 nm-1500 nm (downstream), and 1520 nm-1530 nm (upstream) and for reflection of light with wavelengths of 1260 nm-1280 nm (upstream) and 1575 nm-1580 nm (downstream). A filter plate 2 may be a band-pass filter plate with a pass band range of 1520 nm-1530 nm, or may be a sideband filter with a pass band range of more than or equal to 1520 nm. The filter plate 2 is used for transmission of light with wavelengths of 1520 nm-1530 nm (upstream), and for reflection of light with wavelengths of 1290 nm-1330 nm (upstream), and with wavelengths of 1340 nm-1360 nm (downstream) and of 1480 nm-1500 nm (downstream). A filter plate 3 is a band-pass filter plate with a pass band range of 1340 nm-1360 nm, and used for transmission of light with wavelengths of 1340 nm-1360 nm (downstream), and for reflection of light with wavelengths of 1290 nm-1330 nm (upstream) and 1480 nm-1500 nm (downstream). A filter plate 4 may be a band-pass filter plate with a pass band range of 1520 nm-1530 nm, or may be a sideband filter with a pass band range of more than or equal to 1520 nm. The filter plate 4 is used for transmission of light with wavelengths of 1340 nm-1360 nm (downstream), and for reflection of light with wavelengths of 1520 nm-1530 nm (upstream).

The working principles of WDM1r will be described hereafter. In the upstream direction, the wavelength division multiplexing signals input from the common port of WDM1r include G-PON upstream signals (1290 nm-1330 nm), XG-PON upstream signals (1260 nm-1280 nm) and NG-PON2 upstream signals (1520 nm-1530 nm).

The G-PON upstream signals enter from the common port of WDM1r to a common end of the filter plate 1, are transmitted by the filter plate 1 and then output to a common end of the filter plate 2, are reflected by the filter plate 2 and then output to a common end of the filter plate 3, and are reflected by the filter plate 3 and then output via the G-PON port. The XG-PON upstream signals enter from the common port of WDM1r to the common end of the filter plate 1, and are reflected by the filter plate 1 and then output via the XG-PON port. The NG-PON2 upstream signals enter from the common port of WDM1r to the common end of the filter plate 1, are transmitted by the filter plate 1 and then output to the common end of the filter plate 2, are transmitted by the filter plate 2 and then output to a transmission end of the filter plate 4, and are transmitted by the filter plate 4 and then output from a common end of the filter plate 4 to the NG-PON2 port.

In the downstream direction, WDM1r combines the downstream signals (1480 nm-1500 nm) entering into the G-PON port, the downstream signals (1575 nm-1580 nm) entering into the XG-PON port and the downstream signals (1340 nm-1360 nm) entering into the NG-PON2 port, and the combined signal is sent to the common port of WDM1r.

The G-PON downstream signals enter from the G-PON port of WDM1r to a reflection end of the filter plate 3, are reflected by the filter plate 3 and then output via the common end of the filter plate 3 to a reflection end of the filter plate 2, are reflected by the filter plate 2 and then output via the common end of the filter plate 2 to a transmission end of the filter plate 1, and are transmitted by the filter plate 1 and then output via the common end of the filter plate 1 to the common port of WDM1r.

The XG-PON downstream signals enter from the XG-PON port of WDM1r to a reflection end of the filter plate 1, and are reflected by the filter plate 1 and then output via the common end of the filter plate 1 to the common port of WDM1r.

The NG-PON2 downstream signals enter from the NG-PON2 port of WDM1r to the common end of the filter plate 4, are reflected by the filter plate 4 and then output to a transmission end of the filter plate 3, are transmitted by the filter plate 3 and then output via the common end of the filter plate 3 to the reflection end of the filter plate 2, are reflected by the filter plate 2 and then output via the common end of the filter plate 2 to the transmission end of the filter plate 1, and are transmitted by the filter plate 1 and then output from the common end of the filter plate 1 to the common port of WDM1r.

Figure 14:
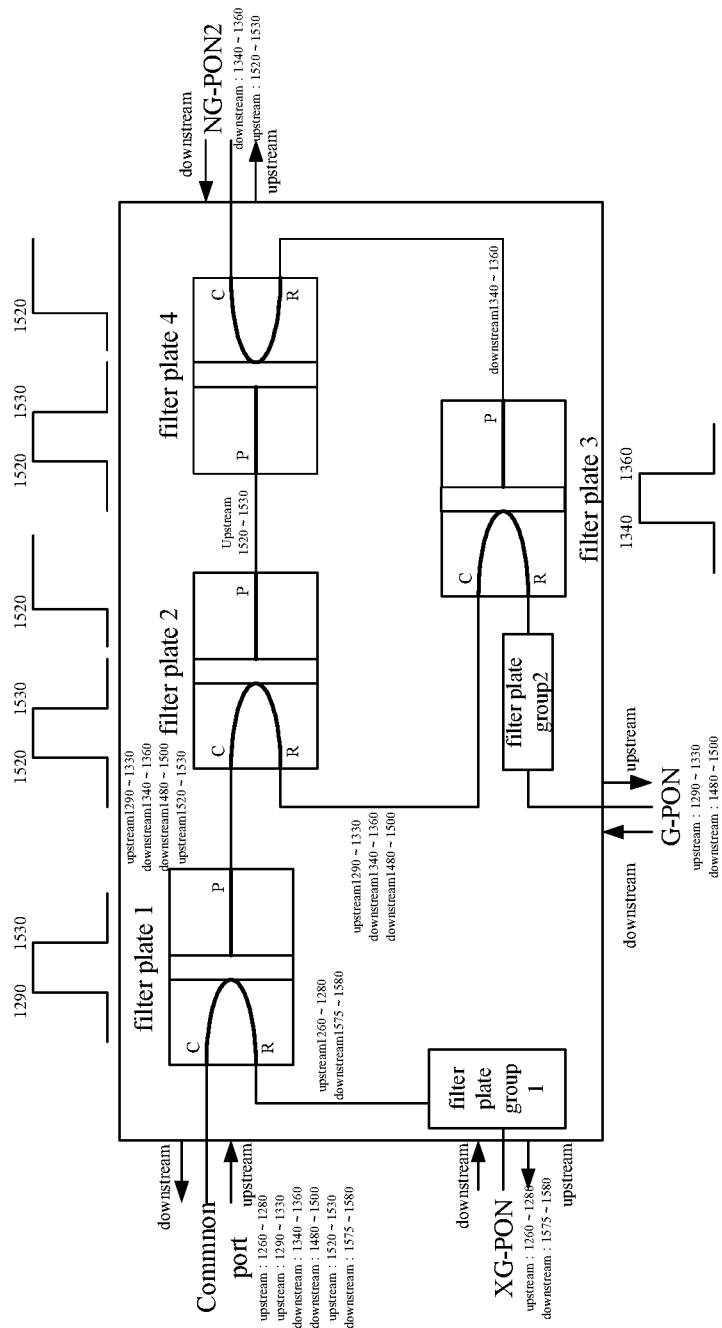
FIG. 14(a) shows a first architecture of a fourth schematic diagram of the structure of WDM when GPON, XGPON1, NGPON2 and Video are in coexistence according to an embodiment of the disclosure.
FIG. 14(b) shows a second architecture of the fourth schematic diagram of the structure of WDM when GPON, XGPON1, NGPON2 and Video are in coexistence according to an embodiment of the disclosure.
FIG. 14(c) shows a third architecture of the fourth schematic diagram of the structure of WDM when GPON, XGPON1, NGPON2 and Video are in coexistence according to an embodiment of the disclosure.
Figure 14B:
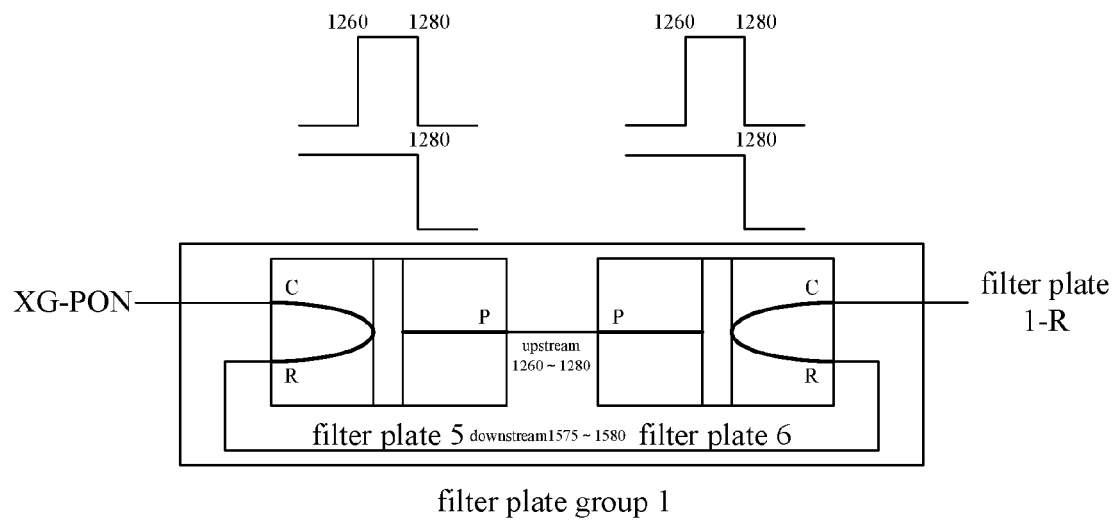
Figure 14C:
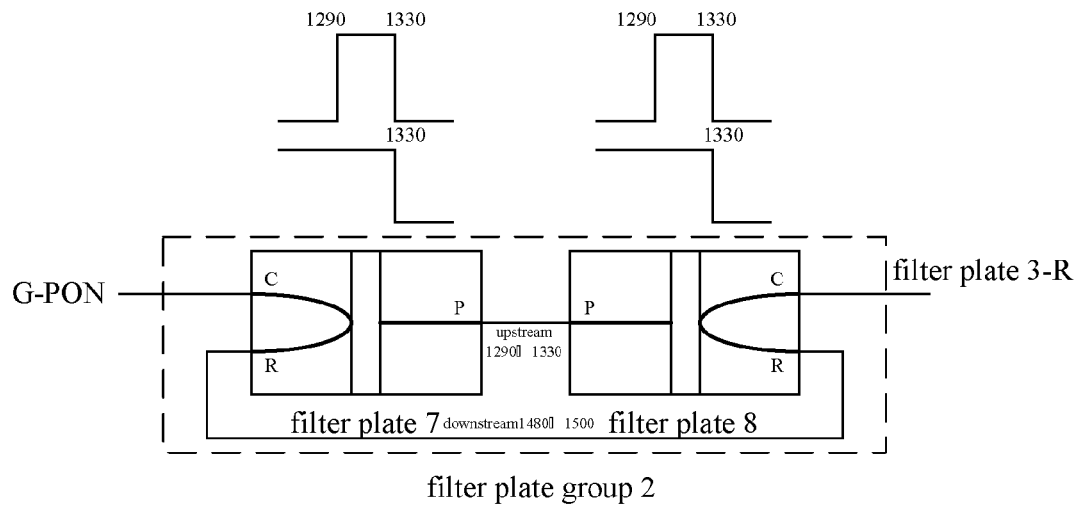

FIG. 14(a) shows a first architecture of a fourth schematic diagram of the structure of WDM when GPON, XGPON1, NGPON2 and Video are in coexistence according to an embodiment of the disclosure; FIG. 14(b) shows a second architecture of the fourth schematic diagram of the structure of WDM when GPON, XGPON1, NGPON2 and Video are in coexistence according to an embodiment of the disclosure; and FIG. 14(c) shows a third architecture of the fourth schematic diagram of the structure of WDM when GPON, XGPON1, NGPON2 and Video are in coexistence according to an embodiment of the disclosure. As shown in FIG. 14(a), FIG. 14(b) and FIG. 14(c), the design of the device can meet the requirements that the isolation between the upstream signals of the systems is greater than 30 dB. In this embodiment, the device is an enhanced WDM1r.

The working principles of the enhanced WDM1r will be described hereafter. With respect to the basic WDM1r, the enhanced WDM1r is added with a filter 5 and a filter 6 between the XG-PON port and the reflection end of the filter 1, so that the isolation between the XG-PON upstream channel (1260 nm-1280 nm) and the other channel is increased. Meanwhile, a filter 7 and filter 8 are added between the G-PON port and the reflection end of the filter 3, so that the isolation between the G-PON upstream channel (1290 nm-1330 nm) and the other channel is increased.

A filter plate 5 may be a band-pass filter plate with a pass band range of 1260 nm-1280 nm, or may be a sideband filter with a pass band range of less than or equal to 1280 nm. A filter plate 6 may be a band-pass filter plate with a pass band range of 1260 nm-1280 nm, or may be a sideband filter with a pass band range of less than or equal to 1280 nm. A filter plate 7 may be a band-pass filter plate with a pass band range of 1290 nm-1330 nm, or may be a sideband filter with a pass band range of less than or equal to 1330 nm. A filter plate 8 may be a band-pass filter plate with a pass band range of 1290 nm-1330 nm, or may be a sideband filter with a pass band range of less than or equal to 1330 nm.

In the upstream direction: the XG-PON upstream signals (1260 nm-1280 nm) input from the common port of WDM1r enter to the common end of the filter plate 1, are reflected by the filter plate 1 and then output to a common end of the filter plate 6, are transmitted by the filter plate 6 and then enter from the transmission end of the filter plate 6 to the transmission end of the filter plate 5, and are transmitted by the filter plate 5 and then output from the common end of the filter plate 5 to the XG-PON port. The G-PON upstream signals (1290 nm-1330 nm) input from the common port of WDM1r enter to the common end of the filter plate 1, are transmitted by the filter plate 1 and then enter to the common end of the filter plate 2, are reflected by the filter plate 2 and then output to the common end of the filter plate 3, are reflected by the filter plate 3 and then output to the common end of the filter plate 8, are transmitted by the filter plate 8 and then enter from a transmission end of the filter plate 8 to the transmission end of the filter plate 7, and are transmitted by the filter plate 7 and then output from the common end of the filter plate 7 to the G-PON port.

In the downstream direction: the XG-PON downstream signals (1575 nm-1580 nm) input from the XG-PON port of WDM1r enter to the common end of the filter plate 5, are reflected by the filter plate 5 and then output to a reflection end of the filter plate 6, are reflected by the filter plate 6 and then enter from the common end of the filter plate 6 to the reflection end of the filter plate 1, and are reflected by the filter plate 1 and then output from the common end of the filter plate 1 to the common port of WDM1r. The G-PON downstream signals (1480 nm-1500 nm) input from the G-PON port of WDM1r enter to the common end of the filter plate 7, are reflected by the filter plate 7 and then output to the reflection end of the filter plate 8, are reflected by the filter plate 8 and then enter from the common end of the filter plate 8 to the reflection end of the filter plate 3, are reflected by the filter plate 3 and then output from the common end of the filter plate 3 to the reflection end of the filter plate 2, are reflected by the filter plate 2 and then output from the common end of the filter plate 2 to the transmission end of the filter plate 1, and are transmitted by the filter plate 1 and then output from the common end of the filter plate 1 to the common port of WDM1r.

Figure 15:
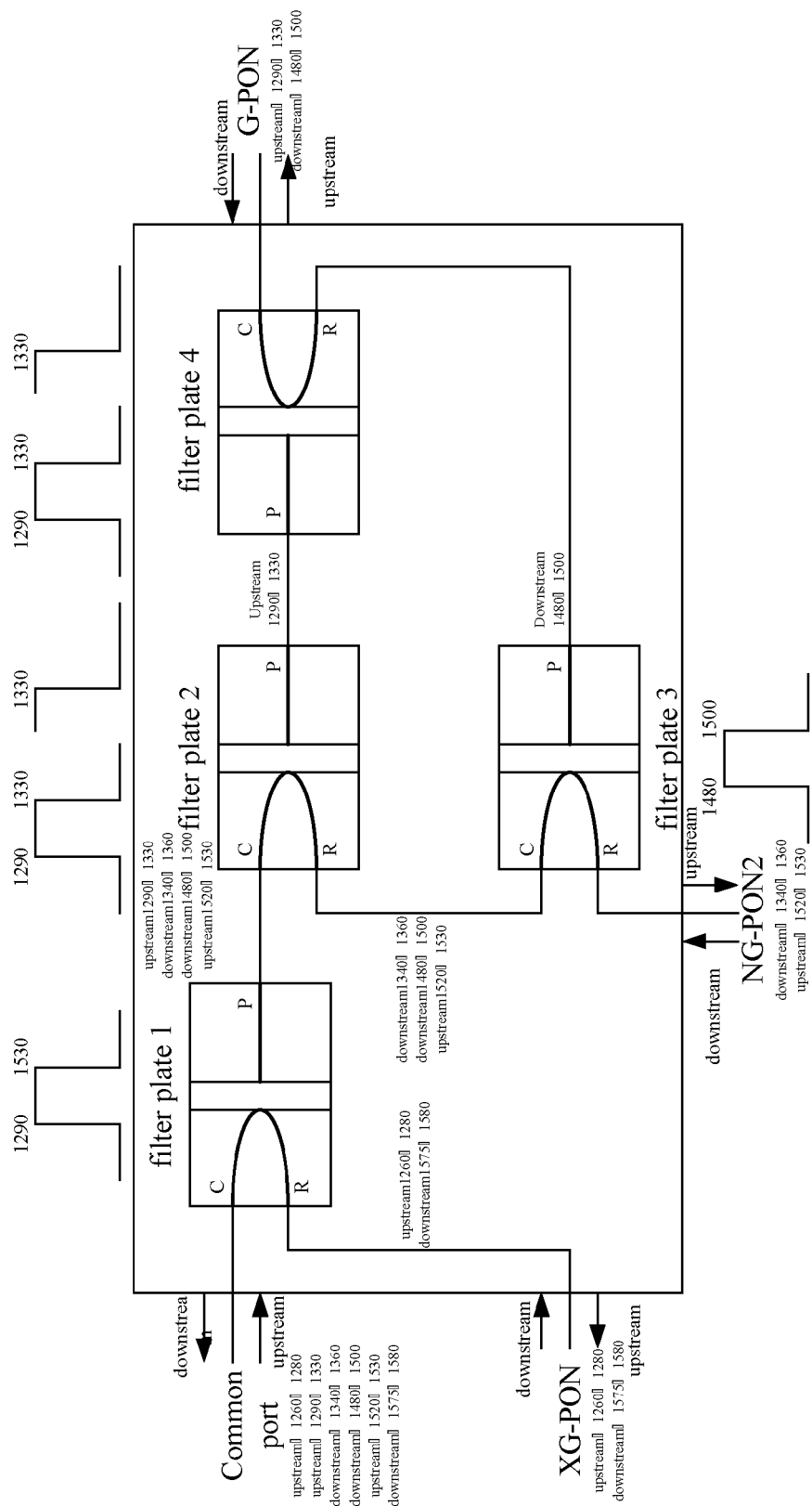
FIG. 15 shows a fifth schematic diagram of the structure of WDM when GPON, XGPON1, NGPON2 and Video are in coexistence according to an embodiment of the disclosure.

FIG. 15 shows a fifth schematic diagram of the structure of WDM when GPON, XGPON1, NGPON2 and Video are in coexistence according to an embodiment of the disclosure. As shown in FIG. 15, the bands of wavelength division and wavelength combination required by this WDM1r include: 1260 nm-1280 nm (upstream), 1290 nm-1330 nm (upstream), 1340 nm-1360 nm (downstream), 1480 nm-1500 nm (downstream), 1520 nm-1530 nm (upstream), and 1575 nm-1580 nm (downstream).

4. Description of Ports of WDM1r

WDM1r in this application is a 4-port device and comprises a common port, a G-PON port, an XG-PON port and an NG-PON2 port.

The common port is connected to a fiber backbone, with operating wavelengths including 1260 nm-1280 nm (upstream), 1290 nm-1330 nm (upstream), 1340 nm-1360 nm (downstream), 1480 nm-1500 nm (downstream), 1520 nm-1530 nm (upstream), and 1575 nm-1580 nm (downstream).

The G-PON port is connected to an OLT optical port of a G-PON system, with operating wavelengths including 1290 nm-1330 nm (upstream) and 1480 nm-1500 nm (downstream).

The XG-PON port is connected to an OLT optical port of an XG-PON system, with operating wavelengths including 1260 nm-1280 nm (upstream) and 1575 nm-1580 nm (downstream).

The NG-PON2 port is connected to an OLT optical port of an NG-PON2 system, with operating wavelengths including 1520 nm-1530 nm (upstream) and 1340 nm-1360 nm (downstream).

The filter plates inside WDM1r will be described hereafter. A filter plate 1 is a band-pass filter plate, with a pass band range of 1290 nm-1530 nm, and used for transmission of light with wavelengths of 1290 nm-1330 nm (upstream), 1340 nm-1360 nm (downstream), 1480 nm-1500 nm (downstream), and 1520 nm-1530 nm (upstream) and for reflection of light with wavelengths of 1260 nm-1280 nm (upstream) and 1575 nm-1580 nm (downstream). A filter plate 2 may be a band-pass filter plate with a pass band range of 1290 nm-1330 nm, or may be a sideband filter with a pass band range of less than or equal to 1330 nm. The filter plate 2 is used for transmission of light with wavelengths of 1290 nm-1330 nm (upstream), and for reflection of light with wavelengths of 1340 nm-1360 nm (downstream), 1480 nm-1500 nm (downstream), and 1520 nm-1530 nm (upstream). A filter plate 3 is a band-pass filter plate with a pass band range of 1480 nm-1500 nm. The filter plate 3 is used for transmission of light with wavelengths of 1480 nm-1500 nm (downstream), and for reflection of light with wavelengths of 1340 nm-1360 nm (downstream), and 1520 nm-1530 nm (upstream). A filter plate 4 may be a band-pass filter plate with a pass band range of 1290 nm-1330 nm, or may be a sideband filter with a pass band range of less than or equal to 1330 nm. The filter plate 4 is used for transmission of light with wavelengths of 1290 nm-1330 nm (upstream), and for reflection of light with wavelengths of 1480 nm-1500 nm (downstream).

The working principles of WDM1r will be described hereafter. In the upstream direction, the wavelength division multiplexing signals input from the common port of WDM1r include G-PON upstream signals (1290 nm-1330 nm), XG-PON upstream signals (1260 nm-1280 nm) and NG-PON2 upstream signals (1520 nm-1530 nm).

The G-PON upstream signals enter from the common port of WDM1r to a common end of the filter plate 1, are transmitted by the filter plate 1 and then output to a common end of the filter plate 2, are transmitted by the filter plate 2 and then output to a transmission end of the filter plate 4, and are transmitted by the filter plate 4 and then output via a common end of the filter plate 4 to the G-PON port. The XG-PON upstream signals enter from the common port of WDM1r to the common end of the filter plate 1, and are reflected by the filter plate 1 and then output via the XG-PON port. The NG-PON2 upstream signals enter from the common port of WDM1r to the common end of the filter plate 1, are transmitted by the filter plate 1 and then output to the common end of the filter plate 2, are reflected by the filter plate 2 and then output to a common end of the filter plate 3, and then are reflected by the filter plate 3 and output from the reflection end of the filter plate 3 to the NG-PON2 port.

In the downstream direction, WDM1r combines the downstream signals (1480 nm-1500 nm) entering into the G-PON port, the downstream signals (1575 nm-1580 nm) entering into the XG-PON port and the downstream signals (1340 nm-1360 nm) entering into the NG-PON2 port, and the combined signal is sent to the common port of WDM1r.

The G-PON downstream signals enter from the G-PON port of WDM1r to the common end of the filter plate 4, are reflected by the filter plate 4 and then output from the reflection end of the filter plate 4 to the transmission end of the filter plate 3, are transmitted by the filter plate 3 and then output from the common end of the filter plate 3 to a reflection end of the filter plate 2, are reflected by the filter plate 2 and then output from the common end of the filter plate 2 to the transmission end of the filter plate 1, and are transmitted by the filter plate 1 and then output from the common end of the filter plate 1 to the common port of WDM1r.

The XG-PON downstream signals enter from the XG-PON port of WDM1r to the reflection end of the filter plate 1, and are reflected by the filter plate 1 and then output via the common end of the filter plate 1 to the common port of WDM1r.

The NG-PON2 downstream signals enter from the NG-PON2 port of WDM1r to the reflection end of the filter plate 3, are reflected by the filter plate 3 and then output to the reflection end of the filter plate 2, are reflected by the filter plate 2 and then output from the common end of the filter plate 2 to the transmission end of the filter plate 1, and are transmitted by the filter plate 1 and then output from the common end of the filter plate 1 to the common port of WDM1r.

Figure 16A:
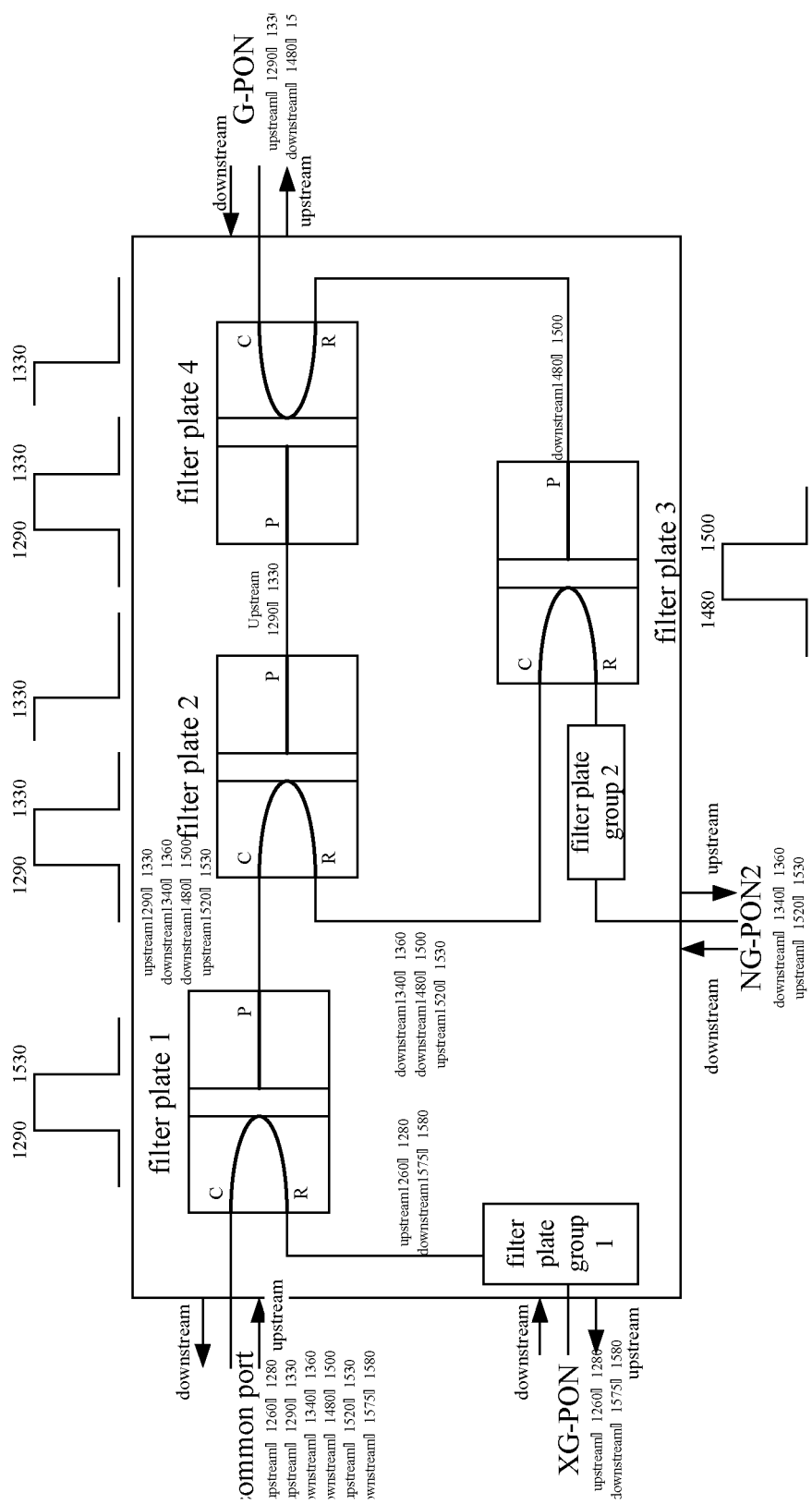
FIG. 16(a) shows a first architecture of a sixth schematic diagram of the structure of WDM when GPON, XGPON1, NGPON2 and Video are in coexistence according to an embodiment of the disclosure.
Figure 16B:
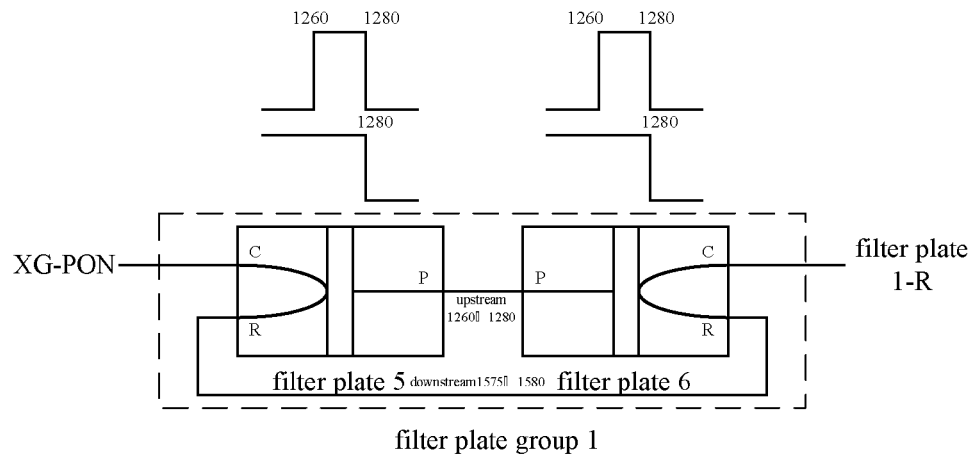
FIG. 16(b) shows a second architecture of the sixth schematic diagram of the structure of WDM when GPON, XGPON1, NGPON2 and Video are in coexistence according to an embodiment of the disclosure.
Figure 16C:
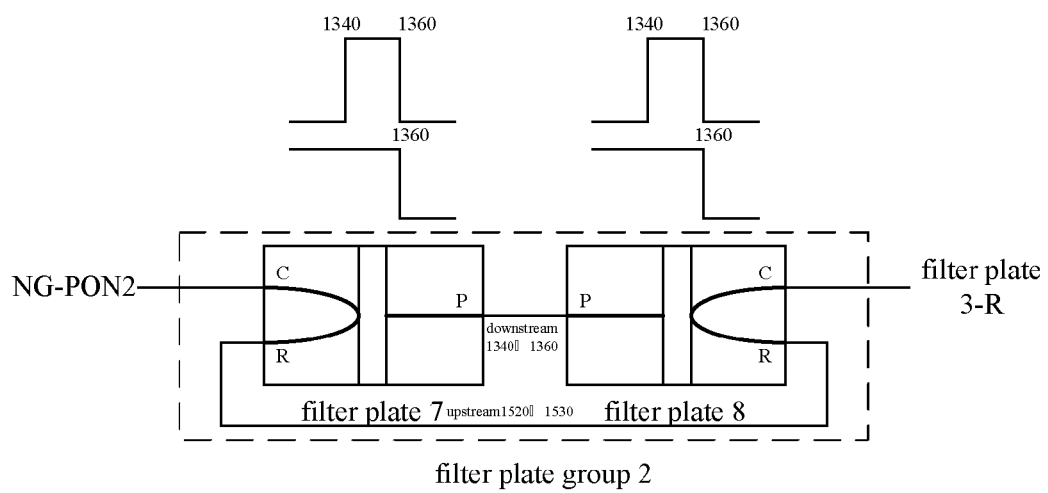
FIG. 16(c) shows a third architecture of the sixth schematic diagram of the structure of WDM when GPON, XGPON1, NGPON2 and Video are in coexistence according to an embodiment of the disclosure.

FIG. 16(a) shows a first architecture of a sixth schematic diagram of the structure of WDM when GPON, XGPON1, NGPON2 and Video are in coexistence according to an embodiment of the disclosure; FIG. 16(b) shows a second architecture of the sixth schematic diagram of the structure of WDM when GPON, XGPON1, NGPON2 and Video are in coexistence according to an embodiment of the disclosure; and FIG. 16(c) shows a third architecture of the sixth schematic diagram of the structure of WDM when GPON, XGPON1, NGPON2 and Video are in coexistence according to an embodiment of the disclosure. The working principles of the enhanced WDM1r will be described hereafter. As shown in FIG. 16(a), FIG. 16(b) and FIG. 16(c), with respect to the basic WDM1r, the enhanced WDM1r is added with a filter 5 and a filter 6 between the XG-PON port and the reflection end of the filter 1 inside the WDM1r, so that the isolations between the XG-PON upstream channel (1260 nm-1280 nm) and the other channels are increased. Meanwhile, a filter 7 and a filter 8 are added between the NG-PON2 port and the reflection end of the filter 3, so that the isolations between the NG-PON2 downstream channel (1340 nm-1360 nm) and the other channels are increased.

The filter plate 5 may be a band-pass filter plate with a pass band range of 1260 nm-1280 nm, or may be a sideband filter with a pass band range of less than or equal to 1280 nm. The filter plate 6 may be a band-pass filter plate with a pass band range of 1260 nm-1280 nm, or may be a sideband filter with a pass band range of less than or equal to 1280 nm. The filter plate 7 may be a band-pass filter plate with a pass band range of 1340 nm-1360 nm, or may be a sideband filter with a pass band range of less than or equal to 1360 nm. The filter plate 8 may be a band-pass filter plate with a pass band range of 1340 nm-1360 nm, or may be a sideband filter with a pass band range of less than or equal to 1360 nm.

In the upstream direction: the XG-PON upstream signals (1260 nm-1280 nm) input from the common port of WDM1r enter to the common end of the filter plate 1, are reflected by the filter plate 1 and then output to the common end of the filter plate 6, are transmitted by the filter plate 6 and then enter from the transmission end of the filter plate 6 to the transmission end of the filter plate 5, and are transmitted by the filter plate 5 and then output from the common end of the filter plate 5 to the XG-PON port. The NG-PON2 upstream signals (1520 nm-1530 nm) input from the common port of WDM1r enter to the common end of the filter plate 1, are transmitted by the filter plate 1 and then enter to the common end of the filter plate 2, are reflected by the filter plate 2 and then output to the common end of the filter plate 3, are reflected by the filter plate 3 and then output to the common end of the filter plate 8, are reflected by the filter plate 8 and then enter from the reflection end of the filter plate 8 to the reflection end of the filter plate 7, and are reflected by the filter plate 7 and then output from the common end of the filter plate 7 to the NG-PON2 port.

In the downstream direction: the XG-PON downstream signals (1575 nm-1580 nm) input from the XG-PON port of WDM1r enter to the common end of the filter plate 5, are reflected by the filter plate 5 and then output to the reflection end of the filter plate 6, are reflected by the filter plate 6 and then enter from the common end of the filter plate 6 to the reflection end of the filter plate 1, and are reflected by the filter plate 1 and then output from the common end of the filter plate 1 to the common port of WDM1r. The NG-PON2 downstream signals (1340 nm-1360 nm) input from the NG-PON2 port of WDM1r enter to the common end of the filter plate 7, are transmitted by the filter plate 7 and then output to the transmission end of the filter plate 8, are transmitted by the filter plate 8 and then enter from the common end of the filter plate 8 to the reflection end of the filter plate 3, are reflected by the filter plate 3 and then output from the common end of the filter plate 3 to the reflection end of the filter plate 2, are reflected by the filter plate 2 and then output from the common end of the filter plate 2 to the transmission end of the filter plate 1, and are transmitted by the filter plate 1 and then output from the common end of the filter plate 1 to the common port of WDM1r.

In this embodiment, when NGPON2 coexists with GPON, XGPON1 and Video, the upstream wavelength band of NGPON2 is in the range of 1500 nm and 1550 nm, preferably in the range of 1520 nm and 1530 nm, and the downstream wavelength band is in the range of 1310 nm and 1480 nm, preferably in the range of 1340 nm and 1360 nm. In the other embodiments, the upstream wavelength band of NGPON2 may also be in the range of 1580 nm and 1625 nm, preferably in the range of 1580 nm to 1600 nm; alternatively, the upstream wavelength band of NGPON2 is in the range of 1560 nm and 1575 nm, and the downstream wavelength band is in the range of 1310 nm and 1480 nm, preferably in the range of 1340 nm and 1360 nm.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

Figure 17:
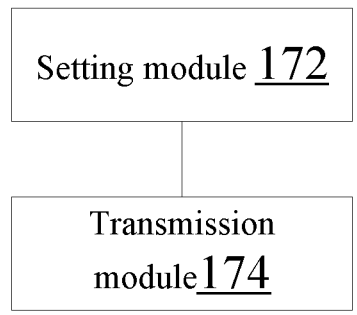
FIG. 17 shows a structural block diagram illustrating a device for transmitting optical signals according to an embodiment of the disclosure.

An embodiment of the disclosure provides a device for transmitting optical signals. The device for transmitting optical signals may be used to implement the above method for transmitting optical signals. FIG. 17 shows a structural block diagram illustrating a device for transmitting optical signals according to an embodiment of the disclosure. As shown in FIG. 17, the device comprises a setting module 172 and a transmission module 174. The structure is described below in detail.

The setting module 172, is configured to, if there is Raman crosstalk between a first optical network system and a coexistence system, set an upstream wavelength band of the first optical network system outside a range with an upstream wavelength band of the coexistence system being a center and with an impact intensity of the Raman crosstalk being the radius, and set the downstream wavelength band of the first optical network system outside a range with a downstream wavelength band of the coexistence system being a center and with an impact intensity of the Raman crosstalk being a radius; and the transmission module 174 is connected to the setting module 172, and is configured to transmit optical signals by using the upstream wavelength band of the first optical network system set by the setting module 172 and the downstream wavelength band of the first optical network system set by the setting module 172.

Figure 18:
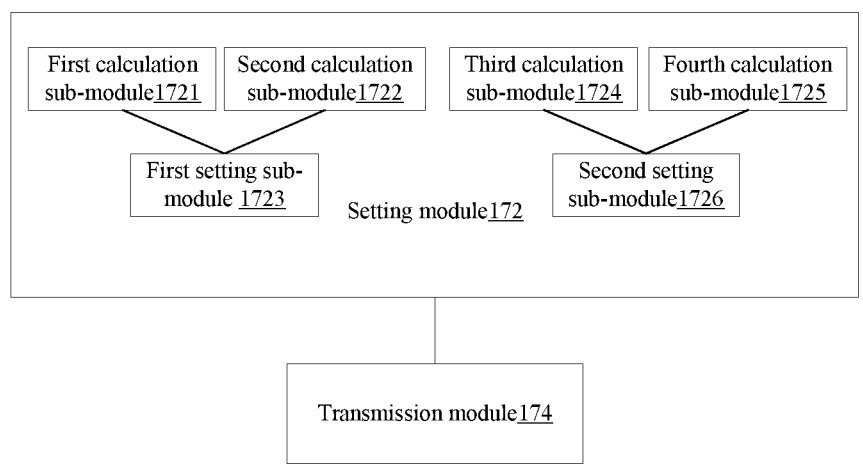
FIG. 18 shows a structural block diagram illustrating a device for transmitting optical signals according to a preferred embodiment of the disclosure.

FIG. 18 shows a structural block diagram illustrating the optical signal transmission device according to a preferred embodiment of the disclosure. As shown in FIG. 18, the setting module 172 comprises a first calculation sub-module 1721, a second calculation sub-module 1722, a first setting sub-module 1723, a third calculation sub-module 1724, a fourth calculation sub-module 1725, and a second setting sub-module 1726. The structure is described below in detail.

The first calculation sub-module 1721 is configured to calculate a first range with an upstream wavelength band of a first coexistence system in the coexistence system being a center and with the impact intensity of the Raman crosstalk being a radius; the second calculation sub-module 1722 is configured to calculate a second range with an upstream wavelength band of a second coexistence system in the coexistence system being a center and with the impact intensity of the Raman crosstalk being the radius; the first setting sub-module 1723 is connected to the first calculation sub-module 1721 and the second calculation sub-module 1722, and is configured to set the upstream wavelength band of the first optical network system outside the range of an intersection of the first range calculated by the first calculation sub-module 1721 and the second range calculated by the second calculation sub-module 1722; the third calculation sub-module 1724 is used to calculate a third range with a downstream wavelength band of the first coexistence system of the coexistence system being a center and with the impact intensity of the Raman crosstalk being a radius; the fourth calculation sub-module 1725 is configured to calculate a fourth range with a downstream wavelength band of the second coexistence system being a center and with the impact intensity of the Raman crosstalk being a radius; and the second setting sub-module 1726 is connected to the third calculation sub-module 1724 and the fourth calculation sub-module 1725, and configured to set the downstream wavelength band of the first optical network system outside a range of the intersection of the third range calculated by the third calculation sub-module 1724 and the fourth range calculated by the fourth calculation sub-module 1725.

Preferably, the first optical network system is a NGPON2 system, and the coexistence system comprises at least one of a GPON system, a XGPON1 system and a Video system.

It should be noted that the device for transmitting optical signals described in the apparatus embodiments corresponds to the method embodiments, with the specific implementation described in the method embodiment in detail, thereby needing no further description.

In summary, a method and device for transmitting optical signals are provided according to the above embodiments of the disclosure. In accordance with the disclosure, the wavelength of the first optical network system is set outside the range with the impact intensity of the Raman crosstalk being the radius, so as to avoid interference and improve signal quality.

Obviously, those skilled in the art shall understand that the above modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for transmitting optical signals, comprising:
   if there is Raman crosstalk between a first optical network system and a coexistence system, setting an upstream wavelength band of the first optical network system outside a range with an upstream wavelength band of the coexistence system being a center and with an impact intensity of the Raman crosstalk being a radius, and setting a downstream wavelength band of the first optical network system outside a range with a downstream wavelength band of the coexistence system being a center and with the impact intensity of the Raman crosstalk being a radius; and
   transmitting the optical signals by using the upstream wavelength band of the first optical network system and the downstream wavelength band of the first optical network system.

2. The method according to claim 1, wherein if there is Raman crosstalk between the first optical network system and a first coexistence system in the coexistence system and between the first optical network system and a second coexistence system in the coexistence system,
   setting the upstream wavelength band of the first optical network system outside the range with the upstream wavelength band of the coexistence system being the center and with the impact intensity of the Raman crosstalk being the radius comprises:
   calculating a first range with an upstream wavelength band of the first coexistence system being a center and with the impact intensity of the Raman crosstalk being a radius;
   calculating a second range with an upstream wavelength band of the second coexistence system being a center and with the impact intensity of the Raman crosstalk being a radius; and
   setting the upstream wavelength band of the first optical network system outside a range of an intersection of the first range and the second range; and
   setting the downstream wavelength band of the first optical network system outside the range with the downstream wavelength band of the coexistence system being the center and with the impact intensity of the Raman crosstalk being the radius comprises:
   calculating a third range with a downstream wavelength band of the first coexistence system being a center and with the impact intensity of the Raman crosstalk being a radius;
   calculating a fourth range with a downstream wavelength band of the second coexistence system being a center and with the impact intensity of the Raman crosstalk being a radius; and
   setting the downstream wavelength band of the first optical network system outside a range of an intersection of the third range and the fourth range.

3. The method according to claim 1, wherein the first optical network system is a Next Gigabit-Capable Passive Optical Network 2 (NGPON2) system, and the coexistence system comprises at least one of the following: a Gigabit-Capable Passive Optical Network (GPON) system, an XGPON1 system and a Video system.

4. The method according to claim 3, wherein if the NGPON2 system coexists with the GPON system and the Video system, an upstream wavelength band of the NGPON2 system is 1575 to 1580 nm, and a downstream wavelength band of the NGPON2 system is 1260 nm to 1280 nm.

5. The method according to claim 3, wherein if the NGPON2 system coexists with the XGPON1 system and the Video system, an upstream wavelength band of the NGPON2 system is 1480 nm to 1500 nm, and a downstream wavelength band of the NGPON2 system is 1290 nm to 1330 nm.

6. The method according to claim 3, wherein if the NGPON2 system coexists with the GPON system and the XGPON1 system, an upstream wavelength band of the NGPON2 system is 1550 nm to 1560 nm, or 1500 nm to 1550 nm, or 1580 nm to 1625 nm, or 1560 nm to 1575 nm, and a downstream wavelength band of the NGPON2 system is 1310 nm to 1480 nm.

7. The method according to claim 6, wherein a four-port wavelength division multiplexer is configured to implement the coexistence of the NGPON2 system, the GPON system and the XGPON1 system, wherein the four-port wavelength division multiplexer is respectively connected to a common port, a port of the NGPON2 system, a port of the GPON system and a port of the XGPON1 system; downstream signals sent from an Optical Line Terminal (OLT) in the NGPON2 system, an OLT in the GPON system and an OLT in the XGPON1 system are respectively input via a port of the four-port wavelength division multiplexer corresponding to the NGPON2 system, a port of the four-port wavelength division multiplexer corresponding to the GPON system and a port of the four-port wavelength division multiplexer corresponding to the XGPON1 system, combined and output to an Optical Distribution Network (ODN), and then forwarded to Optical Network Units (ONUs); and upstream signals sent from an ONU in the NGPON2 system, an ONU in the GPON system and an ONU in the XGPON1 system are transmitted via the ODN, and then input to corresponding OLTs via the port of the four-port wavelength division multiplexer corresponding to the NGPON2 system, the port the port of the four-port wavelength division multiplexer corresponding to the GPON system and the port of the four-port wavelength division multiplexer corresponding to the XGPON1 system.

8. The method according to claim 3, wherein if the NGPON2 system coexists with the GPON system, the XGPON1 system and the Video system, an upstream wavelength band of the NGPON2 system is 1500 nm to 1550 nm, or 1580 nm to 1625 nm, or 1560 nm to 1575 nm, and a downstream wavelength band of the NGPON2 system is 1310 nm to 1480 nm.

9. The method according to claim 8, wherein a five-port wavelength division multiplexer is configured to implement the coexistence of the NGPON2 system, the GPON system, the XGPON1 system and the Video system, wherein the five-port wavelength division multiplexer is respectively connected to a common port, a port of the NGPON2 system, a port of the GPON system and a port of the XGPON1 system; downstream signals sent from an Optical Line Terminal (OLT) in the NGPON2 system, an OLT in the GPON system, an OLT in the XGPON1, and the Video system are input respectively via a port of the five-port wavelength division multiplexer corresponding to the NGPON2 system, a port of the five-port wavelength division multiplexer corresponding to the GPON system, a port of the five-port wavelength division multiplexer corresponding to the XGPON1 system and a port of the five-port wavelength division multiplexer corresponding to the Video system, combined and output to an Optical Distribution Network (ODN), and then forwarded to Optical Network Units (ONUs); and upstream signals sent from an ONU in the NGPON2 system, an ONU in the GPON system and an ONU in the XGPON1 system are transmitted via the ODN and then input to corresponding OLTs via the port of the five-port wavelength division multiplexer corresponding to the NGPON2 system, the port of the five-port wavelength division multiplexer corresponding to the GPON system, and the port of the five-port wavelength division multiplexer corresponding to the XGPON1 system.

10. A device for transmitting optical signals, comprising:
a setting module, configured to, if there is Raman crosstalk between a first optical network system and a coexistence system, set an upstream wavelength band of the first optical network system outside a range with an upstream wavelength band of the coexistence system being a center and with an impact intensity of the Raman crosstalk being a radius, and to set a downstream wavelength band of the first optical network system outside a range with a downstream wavelength band of the coexistence system being a center and with the impact intensity of the Raman crosstalk being a radius; and a transmission module, configured to transmit the optical signals by using the upstream wavelength band of the first optical network system and the downstream wavelength band of the first optical network system.

11. The device according to claim 10, wherein the setting module comprises:
a first calculation sub-module configured to calculate a first range with an upstream wavelength band of a first coexistence system in the coexistence system being a center and with an impact intensity of the Raman crosstalk being a radius;
a second calculation sub-module configured to calculate a second range with an upstream wavelength band of a second coexistence system in the coexistence system being a center and with the impact intensity of the Raman crosstalk being a radius;
a first setting sub-module configured to set the upstream wavelength band of the first optical network system outside a range of an intersection of the first range and the second range;
a third calculation sub-module configured to calculate a third range with a downstream wavelength band of the first coexistence system being a center and with the impact intensity of the Raman crosstalk being a radius;
a fourth calculation sub-module configured to calculate a fourth range with a downstream wavelength band of the second coexistence system being a center and with the impact intensity of the Raman crosstalk being a radius; and
a second setting sub-module configured to set the downstream wavelength band of the first optical network system outside a range of an intersection of the third range and the fourth range.

12. The device according to claim 10, wherein the first optical network system is a Next Gigabit-Capable Passive Optical Network 2 (NGPON2) system, and the coexistence system comprises at least one of the following: a Gigabit-Capable Passive Optical Network (GPON) system, a XGPON1 system and a Video system.

13. The method according to claim 2, wherein the first optical network system is a Next Gigabit-Capable Passive Optical Network 2 (NGPON2) system, and the coexistence system comprises at least one of the following: a Gigabit-Capable Passive Optical Network (GPON) system, an XGPON1 system and a Video system.

14. The device according to claim 11, wherein the first optical network system is a Next Gigabit-Capable Passive Optical Network 2 (NGPON2) system, and the coexistence system comprises at least one of the following: a Gigabit-Capable Passive Optical Network (GPON) system, a XGPON1 system and a Video system.

* * * * *